(12) United States Patent
Natschlaeger et al.

(10) Patent No.: US 12,541,419 B2
(45) Date of Patent: Feb. 3, 2026

(54) TIME BASED CORRELATION OF TIME SERIES FOR ROOT CAUSE ANALYSIS

(71) Applicant: Dynatrace LLC, Waltham, MA (US)

(72) Inventors: Thomas Natschlaeger, Hagenberg (AT); Katrin Leberfinger, Aldersbach (DE); Damian Bogdanowicz, Gdansk (PL); Michael Altenhuber, Hagenberg im Muehlkreis (AT)

(73) Assignee: Dynatrace LLC, Boston, MA (US)

( * ) Notice: Subject to any disclaimer, the term of this patent is extended or adjusted under 35 U.S.C. 154(b) by 25 days.

(21) Appl. No.: 18/666,910

(22) Filed: May 17, 2024

(65) Prior Publication Data

US 2024/0394136 A1    Nov. 28, 2024

Related U.S. Application Data

(60) Provisional application No. 63/468,581, filed on May 24, 2023.

(51) Int. Cl.
*G06F 11/07* (2006.01)

(52) U.S. Cl.
CPC ........ *G06F 11/079* (2013.01); *G06F 11/0709* (2013.01)

(58) Field of Classification Search
CPC ............. G06F 11/0706; G06F 11/0709; G06F 11/079; G06F 11/0793
See application file for complete search history.

(56) References Cited

U.S. PATENT DOCUMENTS

| | | | |
|---|---|---|---|
| 10,514,974 B2 * | 12/2019 | Togawa | G06F 11/079 |
| 10,942,837 B2 * | 3/2021 | Vidal | G06F 11/3452 |
| 12,189,466 B2 * | 1/2025 | Verma | G06F 11/0709 |
| 2016/0092516 A1 | 3/2016 | Poola et al. | |

(Continued)

FOREIGN PATENT DOCUMENTS

WO    2018134633 A1    7/2018

OTHER PUBLICATIONS

Mahimkar, Ajay, et al. "Troubleshooting Chronic Conditions in Large IP Networks." Proceedings of the 2008 ACM CoNext Conference, pp. 1-12. Dec. 9, 2008. (Year: 2008).*

(Continued)

*Primary Examiner* — Joseph R Kudirka

(57) ABSTRACT

The disclosure concerns the time-based correlation of time series for the root cause analysis of application monitoring data, observability data, and data observability data in the field of application monitoring and observability. The object of the disclosure is to find at least one candidate time series that has a high chance/probability for causing an event in a reference time series. The method shall be time-based and not frequency based. The method includes: constructing a simplified reference time series retaining changes in the reference time series and setting other points to zero; constructing a simplified candidate time series retaining changes in the candidate time series and setting other points to zero; calculating a similarity metric between the simplified candidate time series and the simplified reference time series; and reporting an occurrence of a computing event in response to the similarity metric exceeding a threshold value.

16 Claims, 18 Drawing Sheets

(56) References Cited

U.S. PATENT DOCUMENTS

Figure 5:
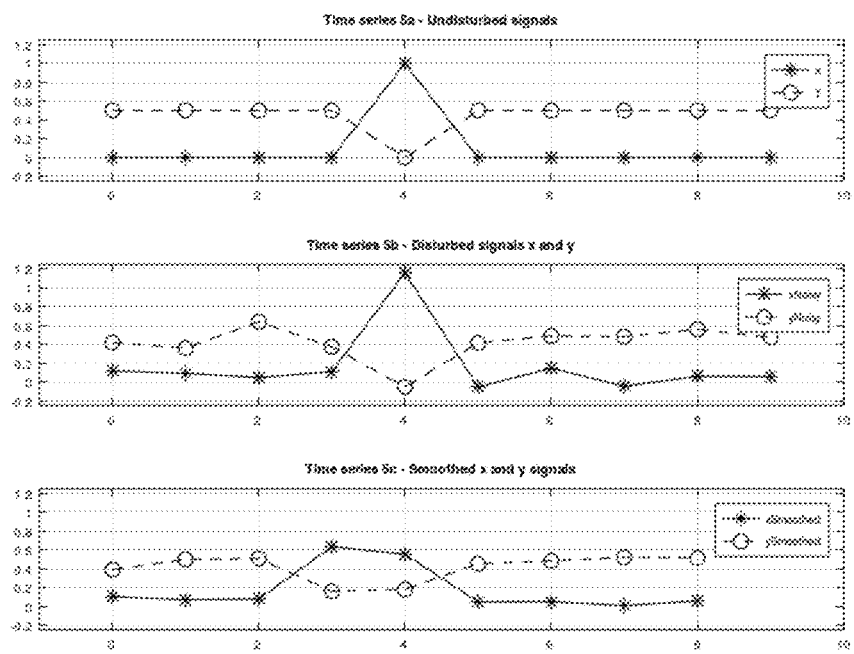

| | | | |
|---|---|---|---|
| 2016/0203036 A1* | 7/2016 | Mezic | G06F 11/0751 |
| | | | 714/819 |
| 2019/0266039 A1 | 8/2019 | Ochiai | |
| 2021/0117824 A1* | 4/2021 | Azmandian | G06N 5/04 |
| 2021/0341910 A1* | 11/2021 | Song | G05B 23/0235 |
| 2022/0036235 A1 | 2/2022 | Jinguu | |

OTHER PUBLICATIONS

"Höppner Frank Ed—Blockeel Hendrik et al: ""Improving time series similarity measures by integrating preprocessing steps""", Journal of Data Mining and Knowledge Discovery, Norwell, MA, US, vol. 31, No. 3, Jan. 11, 2017 (Jan. 11, 2017), pp. 851-878,".

* cited by examiner

Fig. 1
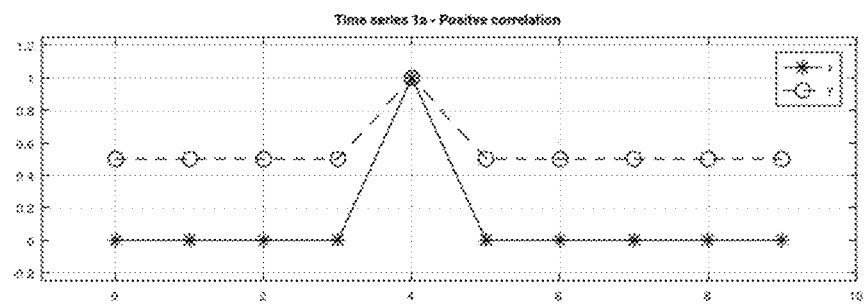
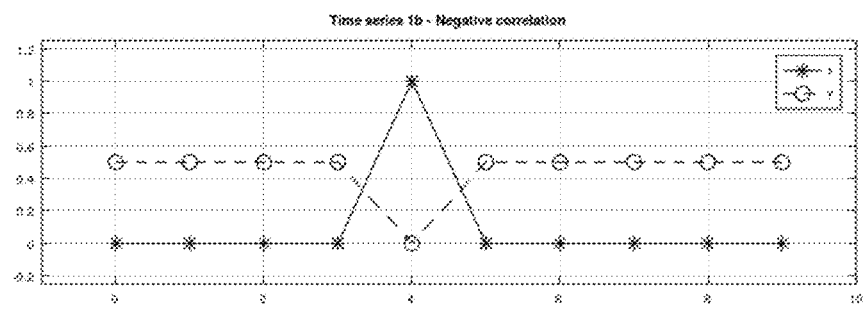
Fig. 2
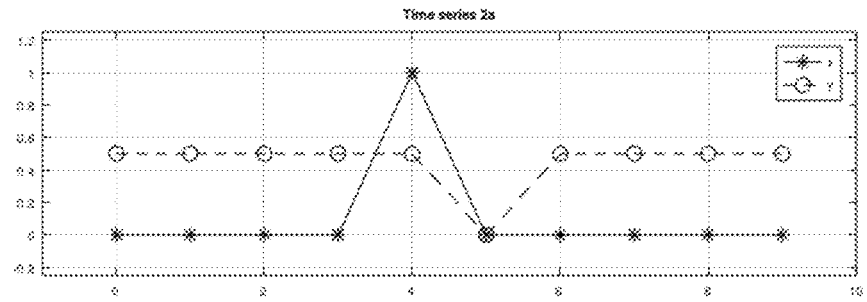
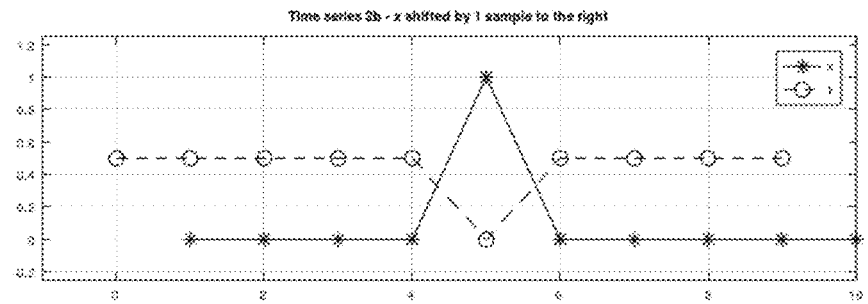

Fig. 3
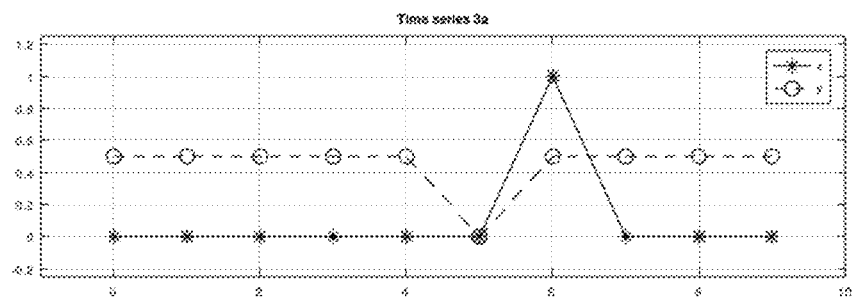
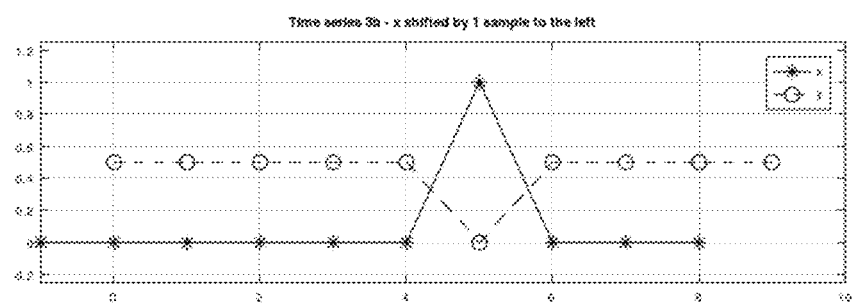
Fig. 4
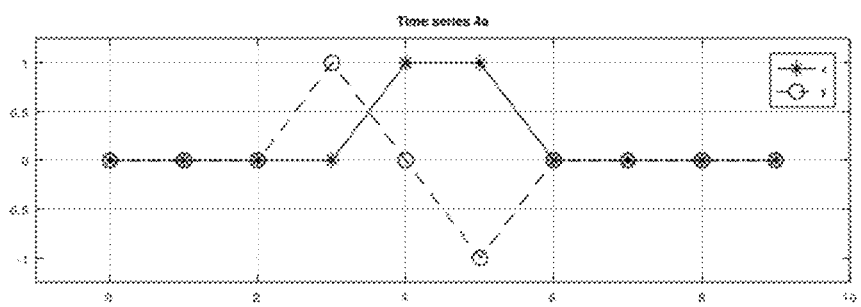
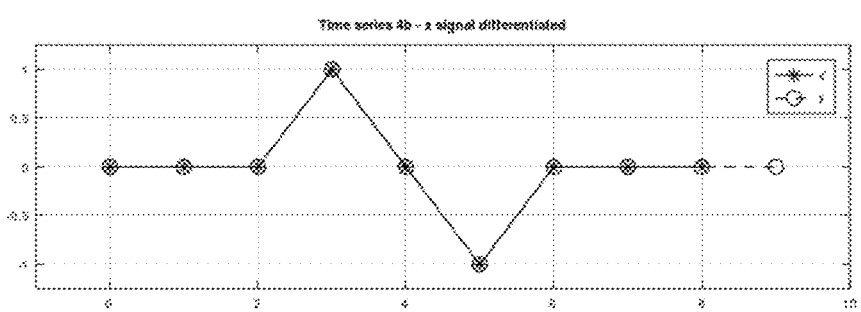

Fig. 7
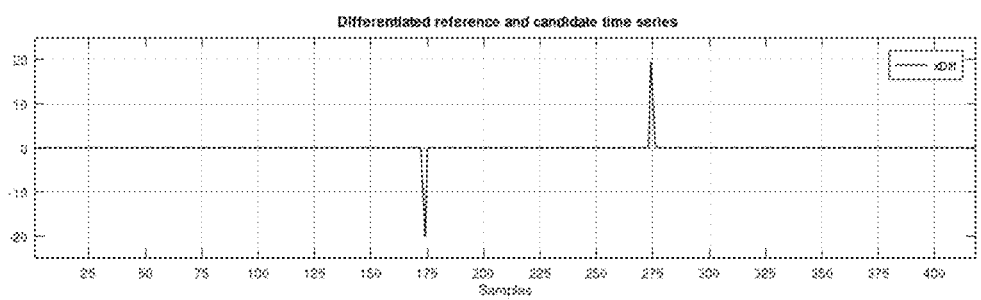
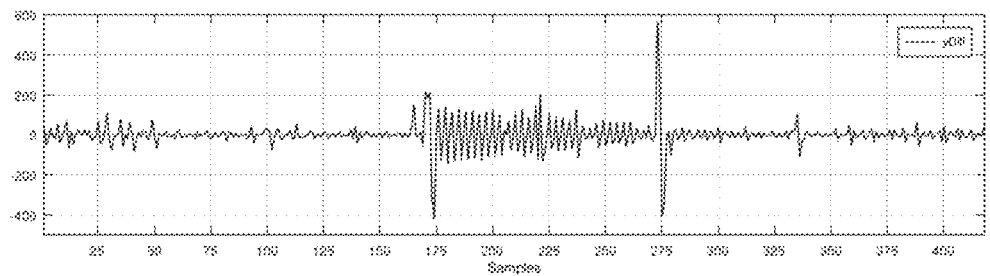
Fig. 8
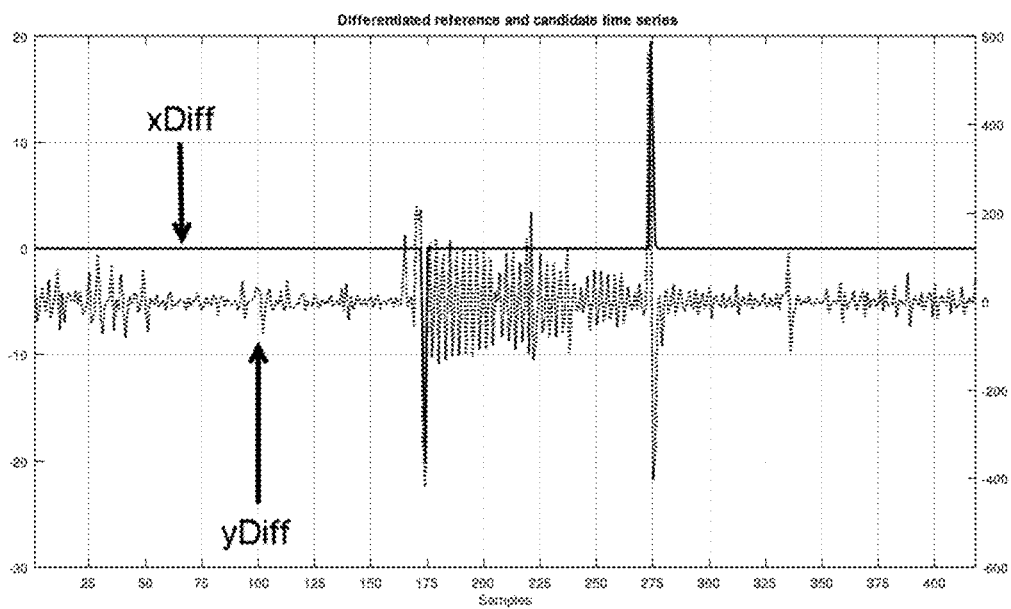

Reference and candidate time series x, y

Shifted reference time series and candidate time series

Shifted and smoothed time series

TIME BASED CORRELATION OF TIME SERIES FOR ROOT CAUSE ANALYSIS

CROSS-REFERENCE TO RELATED APPLICATIONS

This application claims the benefit and priority of U.S. Provisional Application No. 63/468,581 filed on May 24, 2023. The entire disclosure of the above application is incorporated herein by reference.

FIELD

The disclosure concerns the field of application monitoring and observability within the broad field of information technology. In particular, the disclosure concerns the time-based correlation of time series for the root cause analysis of application monitoring data, observability data, and data observability data.

BACKGROUND

Application performance monitoring (APM) and observability software allows users, such as IT operators, site reliability engineers, cloud and platform operators, application developers, and product owners, to observe and analyze the application health, performance, and user experience. Such APM and observability software may be self-hosted software, vendor-managed hosted software, or software as a service (SaaS). In order to monitor the performance of applications, computers or entire computer environments, massive amounts of data are logged, such as log lines, traces from applications, metrics etc. Such data, herein referred to as application monitoring and observability data, coupled to the temporal dimension (i.e. the date and time when a data signal for an event was created or logged) of the data constitutes time series data.

In case of an interesting event, e.g. an unexpected surge of CPU load, users are typically interested in finding the root cause for the event. As many computers and/or applications either run in a cloud computing environment or are connected to one or more cloud computing environments for storage or analysis, finding the root cause for an event is difficult since potentially many connections to hosts, containers, APIs etc. need to be analyzed.

How time series without a priori knowledge about them can be analyzed quickly and efficiently in order to find the root cause or at least candidates having a high chance/probability for being the root cause of the event is not yet fully satisfactory resolved in the art.

This section provides background information related to the present disclosure which is not necessarily prior art.

SUMMARY

This section provides a general summary of the disclosure, and is not a comprehensive disclosure of its full scope or all of its features.

The object of the disclosure is to find a computer implemented method for finding at least one candidate time series y that has a high chance/probability for causing an event in a reference time series x. The method shall be time-based and not frequency based, e.g. based on the results of a Fourier Transformation.

According to a first aspect of the disclosure, this objective is solved by a computer implemented method for identifying a candidate time series y having a high chance/probability for causing an event comprised in a reference time series x, wherein both time series comprise at least one of application monitoring data, observability data, and data observability data, the method comprising the following steps: 1) receiving the reference time series x comprising the event and the at least one candidate time series y; 2) calculating the correlation coefficient between the reference time series x and the candidate time series y; 3) differentiating at least one of the reference time series x into a differentiated reference time series x', and the candidate time series y into a differentiated candidate time series y'; 4) calculating at least one correlation coefficient between the differentiated reference time series x' and the candidate time series y, the reference time series x and the differentiated candidate time series y', and the differentiated reference time series x' and the differentiated candidate time series y'; 5) shifting at least one of the reference time series x, and the differentiated reference time series x' by S samples into a shifted reference time series xShift; 6) calculating the correlation coefficient between the shifted reference time series xShift and i) the candidate time series y or ii) the differentiated candidate time series y'; 7) smoothing at least one of the reference time series x, the differentiated reference time series x', and the shifted reference time series xShift into a smoothened reference time series xSmooth and smoothing at least one of the candidate time series y, and the differentiated candidate time series y' into a smoothened candidate time series ySmooth, whereby the smoothing is performed by applying a smoothing function to the respective time series; 8) calculating the correlation coefficient between the smoothened reference time series xSmooth and the smoothened candidate time series ySmooth; and 9) output the candidate time series y for which the absolute value of the correlation coefficient is greater or equal to a threshold t, |correlation coefficient|≥t.

In the first step, a reference time series x comprising the event of interest and typically hundreds or thousands of candidate time series y are received by a computer or computer system performing the disclosed method. The reference time series x and the candidate time series y comprise multiple samples representing the temporal development of these signals, respectively. The sampling frequency can be in seconds, minutes, hours, days and of course parts or multiples of it. Preferably, the same sampling frequency is used for the reference time series x and the candidate time series y. In the second step, a correlation coefficient, e.g. the Pearson correlation coefficient r, is calculated between the reference time series x and the candidate time series y. In the third step, at least one of the reference time series x is differentiated into a differentiated reference time series x', and the candidate time series y is differentiated into a differentiated candidate time series y'. The differentiation can be done by calculating the difference between successive samples, e.g. by $x_i' = x_i - x_{i-1}$ and $y_i' = y_i - y_{i-1}$, respectively, or by applying other well-known differentiation algorithms, such as the Savitzky-Golay-Filter. In step four, at least one correlation coefficient is calculated between the differentiated reference time series and the candidate time series, the reference time series and the differentiated candidate time series, and the differentiated reference time series and the differentiated candidate time series. In step five, at least one of the reference time series x, and the differentiated reference time series x' is shifted by S samples into a shifted reference time series. Typically, the shifting is done multiple times, say by −2 samples, −1 sample, 1 sample, and 2 samples. A positive number of S samples represents a time lag, i.e. a shift into the past, whereas a negative number represents a time lead, i.e. a shift into the future. In the sixth step, the correlation coefficient is calculated between the shifted reference time series and i) the candidate time series y or ii) the differentiated candidate time series. Instead of shifting the reference time series, the candidate time series could be shifted alternatively. As this has the same effect, it is considered equivalent. In the seventh step, at least one of the reference time series x, the differentiated reference time series, and the shifted reference time series is smoothened into a smoothened reference time series and at least one of the candidate time series y, the differentiated candidate time series, and the shifted candidate time series is smoothened into a smoothened candidate time series. The smoothing can be done by an averaging operation, e.g. by applying a sliding window, or by filtering the time series using a digital filter, preferably a lowpass filter. In the eighth step, the correlation coefficient is calculated between the smoothened reference time series and the smoothened candidate time series. Finally, in step 9, the candidate time series y are output for which the absolute value of the correlation coefficient is greater or equal to a threshold t, |correlation coefficient|≥t. Preferably, the candidate time series are output in an ordered manner, e.g. the candidate time series having the highest absolute value of the correlation coefficient is listed first, then the candidate time series with the next lower correlation coefficient, and so on.

In a preferred embodiment, steps 5 and 6 are repeated multiple times for different numbers of samples S. For example, initially the reference time series x is shifted by 5 samples, next by 4 samples, . . . next by 1 sample, then by −1 sample . . . , then by −4 samples, and finally by −5 samples. Note that 5 is an arbitrary integer value. In these cases, the correlation for all combinations of the shifted reference time series and the candidate time series are computed.

In another preferred embodiment, the smoothing function is a sliding window or a digital low-pass filter.

According to another preferred embodiment, steps 7 and 8 are repeated multiple times to reflect the effect of different smoothing functions. E.g. in a first smoothing run, both the reference time series and the candidate time series are smoothened by a sliding window having a width of 2, in the next run the sliding window has a width of 3 etc. Typically, the smoothing is done for all combinations of shifted reference time series and candidate time series.

In a first exemplary embodiment with one reference time series and only one candidate time series, five different shifting operations (representing the shifts by −2, −1, 0, 1, and 2 samples) of the reference time series, three different smoothing operations (sliding window widths 1, 2 and 3), and three combinations of differentiations (differentiating the reference time series only, the candidate times series only, and both the reference time series and the candidate times series), 45 (=5*3*3) combinations of time series signals are investigated. It is noted that of all the different combinations, only the combination with the highest similarity (highest absolute value of the correlation coefficient) is used for comparison with other candidate time series.

The disclosure is not limited to any specific correlation coefficient, although the Pearson correlation coefficient r is used in the application examples. Examples for other well-known correlation coefficients include Spearman coefficient and the Kendals Tau coefficient.

According to another aspect of the disclosure, the object of the disclosure mentioned above is solved by a computer implemented method for identifying a candidate time series y having a high chance/probability for causing an event comprised in a reference time series x, wherein both time series x, y comprise at least one of application monitoring data, observability data, and data observability data, the method comprising the following steps: 1) receiving the reference time series x comprising the event and the at least one candidate time series y; 2) identifying the timing $t_x$ of events, such as of level changes, spikes, plateaus, and changes in variance/noise level . . . in the reference time series x; 3) constructing a simplified reference time series $\tilde{x}$ comprising the events by adding a function having a rising edge and a falling edge around the identified time $t_x$ to an initially empty time series; 4) identifying the timing $t_y$ of events, such as level changes, spikes, plateaus, and changes in variance/noise level . . . in the at least one candidate time series y; 5) constructing at least one simplified candidate time series $\tilde{y}$ comprising the events by adding the function having a rising edge and a falling edge around the identified time $t_y$ to an initially empty time series; 6) calculating a similarity coefficient SC between the simplified reference time series $\tilde{x}$ and a simplified candidate time series $\tilde{y}$; and 7) output the candidate time series y for which the absolute value of the similarity coefficient SC is greater or equal to a threshold t, |SC|≥t.

The embodiment mentioned first in the disclosure which calculates correlation coefficients, e.g. the Pearson correlation coefficient r, between variants of the reference time series x and variants of the candidate time series y works best in case there is a linear dependency between the reference time series x and the candidate time series y, e.g. y=k*x+d. If x and y are correlated in a way that such a linear dependency does not hold, correlation coefficients are generally low. In contrast to this, the second embodiment, where the events in the time series x and y are detected and simplified time series $\tilde{x}$, $\tilde{y}$ are constructed based on the events in x and y, allows the detection of more complex relationships, particularly non-linear relationships, between the x and y time series. For example, a timeseries x which has a level changepoint at a given time can be correlated to a timeseries y where at the same time the variance/noise level starts to increase. Such combinations of events are difficult to detect using correlation coefficients.

Preferably, the event-based embodiment of the disclosure uses efficient methods to detect multiple events in a time series x, y. Basically, any well-known change point detection algorithm like OPT, PELT, BinarySegmentation (see Truong, C. et al: "Selective review of offline change point detection methods", http://www.laurentoudre.fr/publis/TOG-SP-19.pdf) in combination with different time series models (constant, linear time dependent, Gaussian, etc.) can be used, as well as statistical anomaly detection methods, such as the Hampel-Filter (see Pearson, R. K. et al: "Generalized hampel filters", EURASIP Journal on Advances in Signal Processing, 2016, 1-18) to detect e.g. spikes, or the CUSUM method (see Schmidl, S. et. al: "Anomaly Detection in Time Series: A Comprehensive Evaluation", http://vldb.org/pvldb/vol15/p1779-wenig.pdf) for a review about univariate anomaly detection methods which can be applied. Care should be taken about the runtime complexity. As the event detection has to be applied to each time series individually, any runtime complexity beyond O(n log n), n being the length of the time series, might be too costly. In particular this is crucial for the reliable detection of change points in level, trend and variability/noise level for which the PELT and BinarySegmentation are well suited. These algorithms require m executions of fitting a univariate time series model to a given time series, where m is the maximum number of events to be found (m=n for PELT and m is proportional to n for BinarySegmentation). Fitting a univariate time series model to a timeseries of length n also typically has a runtime complexity of O(n). Hence, classical implementations of these algorithms lead to an overall runtime complexity of $O(n^2)$ which may be restrictive for large scale application. Therefore, algorithms for the detection of events with a runtime complexity of O(n) are advantageous. Hence, the applicant has developed algorithms allowing the change point detection for level, trend and noise level changes based on PELT and BinarySegmentation, which have a runtime complexity of O(n). The key to this significant reduction of runtime complexity is the observation that it is possible to use incremental updates, like Welford's online algorithm (see Welford, B. P.: "Note on a method for calculating corrected sums of squares and products", *Technometrics*. 4 (3): 419-420, 1962) to compute the quality of fit (in terms of a sum squared error), of the individual time series models during the execution of PELT and BinarySegmentation. This reduces the effort by search step from an average of O(n) to O(1), hence resulting in an overall runtime complexity of O(n).

Contrary to the first aspect of the disclosure, events, such as level changes, spikes, plateaus (i.e. the signal raising from one level to a second level, staying at that level for some time, and returning to the first level), trend changes, frequency changes etc. are identified in both the reference time series x and the at least one candidate time series y. The identification of events reports at least the timing $t_x$, $t_y$ of the events in the respective time series x, y. Typically, two times for each event are reported, a first time reporting the begin of an event, and a second time reporting the end of an event. Note that a plateau may be represented by two level changes, e.g. one level change from a first level to a second level, and another level change from the second level to the first level.

The events being identified in the reference time series x and the at least one candidate time series y are used to construct, i.e. build, a simplified reference time series $\tilde{x}$ and at least one simplified candidate time series $\tilde{y}$. As outlined above, algorithms—although being computationally expensive—for the detection of events in the time series are known in the art. In case only one time t is identified for a specific event, such as a spike or a level change, a function is added to an initially empty time series having a rising edge and a falling edge around the identified time t. In case two times $t_1$, $t_2$ are identified for a specific event, such as a plateau, typically the rising edge of the function is at the first time $t_1$ and the falling edge of the function is at the second time $t_2$. The advantage of using simplified time series for the reference time series x and the candidate time series y avoids the effect of noise/disturbances on the similarity coefficient calculated between the simplified time series x, y. In addition, the time series can be stored much more compact. Moreover, the calculation of the similarity coefficient can be performed quicker and with lower CPU load compared to calculating the correlation coefficient for the original time series. When searching a root cause for an event contained in the reference time series x in multiple candidate time series y, only such candidate time series y are reported for which the absolute value of the similarity coefficient SC is greater or equal to a threshold t, $|SC| \geq t$.

According to a preferred embodiment, the function is a Gaussian function, an impulse signal, a rectangular signal, or a signal with a ramp as a rising edge and a ramp as a falling edge.

According to another embodiment of the disclosure, the identification of events in the time series x, y additionally identifies the level of confidence LC of an event being present in the respective time series.

The level of confidence LC may be used to adapt the height of the function at time $t_x$ in the simplified reference time series $\tilde{x}$, such that the height corresponds to the level of confidence LC of the event in the reference time series x. Something analogue can be done for the candidate time series y. In these cases, the simplified time series $\tilde{x}$, $\tilde{y}$ have a value of LC at a time where an event as identified, and a value of 0 otherwise.

According to one embodiment, the similarity coefficient is a correlation coefficient, e.g. the Pearson correlation coefficient r.

According to another preferred embodiment of the disclosure, the simplified time series $\tilde{x}$, $\tilde{y}$ have an integer value n, preferably n=1, at a time where an event was identified, and a value of 0 otherwise. Assuming the decimal encoding of the integer, n is preferably between 1 and 9, as the integer 10 would be represented by two characters, namely "1" and "0". Assuming hexadecimal encoding of the integer, n is preferably between 1 and 15, and so on.

The encoding of simplified time series $\tilde{x}$, $\tilde{y}$ allows storing the time series either in integer format or, in case n=1, even in binary format, i.e. as a succession of bits. Whereas storing a double typically takes 8 Bytes, a binary encoding takes just 1 bit, i.e. 1/64 of this. By doing so, even long simplified time series can be stored using little RAM memory or disk memory.

In this case, the similarity coefficient SC is preferably defined as $$SC = 1 - \frac{ED[\tilde{x}, \tilde{y}]}{\max[\text{length}(\tilde{x}), \text{length}(\tilde{y})]}$$

where ED is the Levenshtein distance between the simplified time series x, y. The similarity coefficient is based on the Levenshtein distance and takes the length of the respective time series into account.

Although the Levenshtein distance or Edit distance was defined as a similarity measure for strings only, this measure produces very good results for time-series too since an edit distance of 1 between two strings corresponds to one difference, i.e. a substitution, an insertion, or a deletion, of one character in order to transfer the first string into the second string. If the simplified time series are encoded in such a way that the presence of an event at a time in the time series is represented by an a) integer (preferably encoded as one character), or b) by 1, and the lack of an event is encoded as 0 then the simplified time series can be encoded an array of integers (case a) or of bit values (case b). In such cases the edit distance is a good and efficient measure to compare the similarity between two time-series.

This preferred embodiment allows shortening of the simplified time series $\tilde{x}$, $\tilde{y}$ by removing identical leading and/or trailing portions of $\tilde{x}$, $\tilde{y}$. Doing this, the similarity coefficient SC based on the shortened simplified time series $\tilde{x}*$, $\tilde{y}*$ is $$SC = 1 - \frac{ED[\tilde{x}*, \tilde{y}*]}{\max[\text{length}(\tilde{x}), \text{length}(\tilde{y})]}$$

where ED is the Levenshtein distance between the shortened simplified time series $\tilde{x}*$, $\tilde{y}*$, and length($\tilde{x}$), length($\tilde{y}$) is the length of the simplified time series $\tilde{x}$, $\tilde{y}$, respectively.

According to another preferred embodiment of the disclosure, events, such as level changes, trend changes, spikes, and changes in noise level or variance, in the time series x, y are identified by a PELT algorithm or a BinarySegmentation algorithm.

Using an incremental timeseries model in the PELT or Binary-Segmentation algorithm allows the detection of events to be performed in an overall time complexity of O(n).

Further areas of applicability will become apparent from the description provided herein. The description and specific examples in this summary are intended for purposes of illustration only and are not intended to limit the scope of the present disclosure.

DRAWINGS

Figure 6:
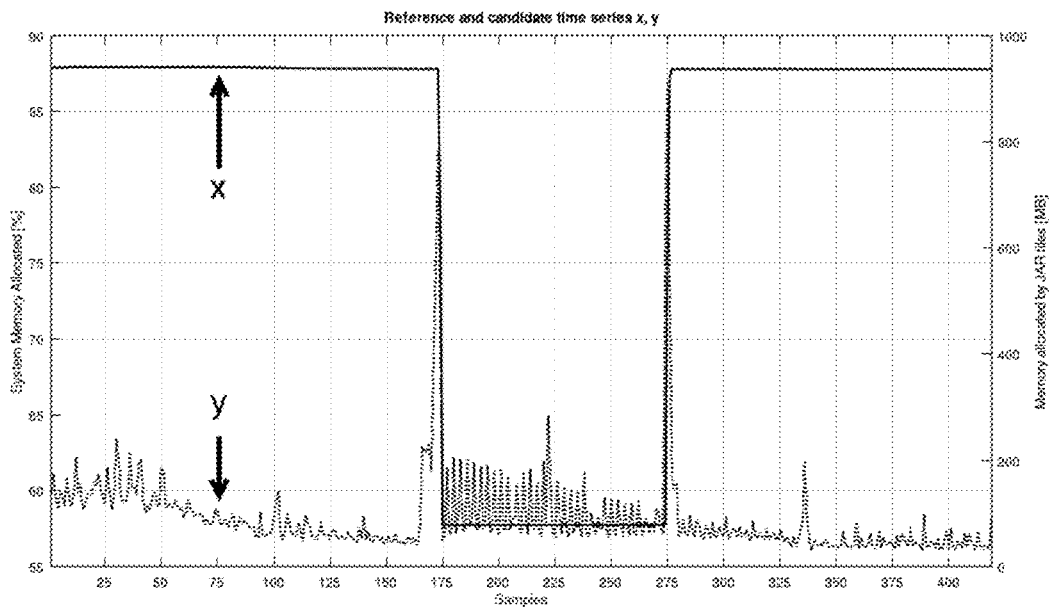
Figure 9:
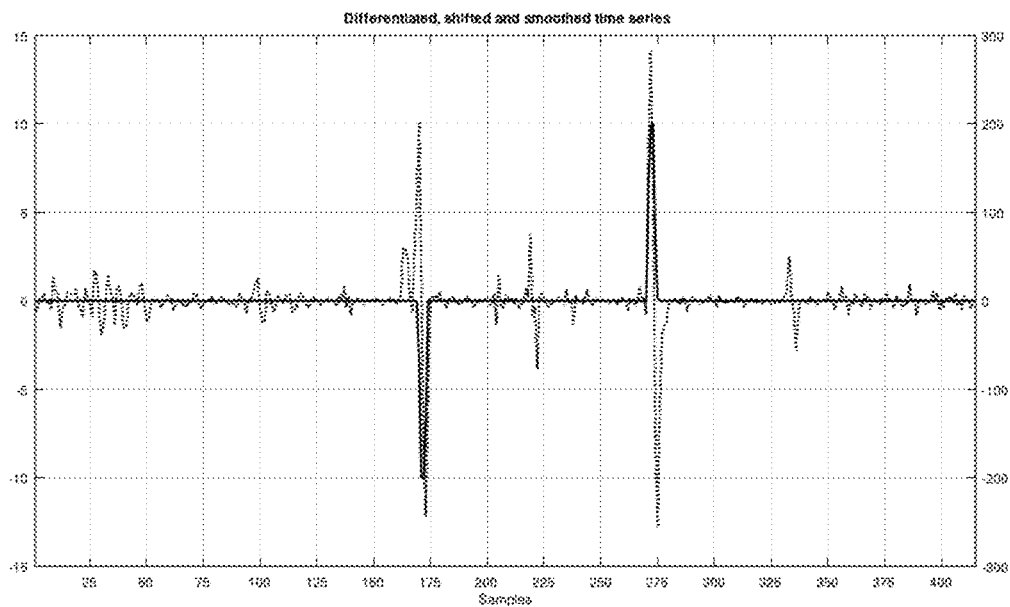
Figure 10:
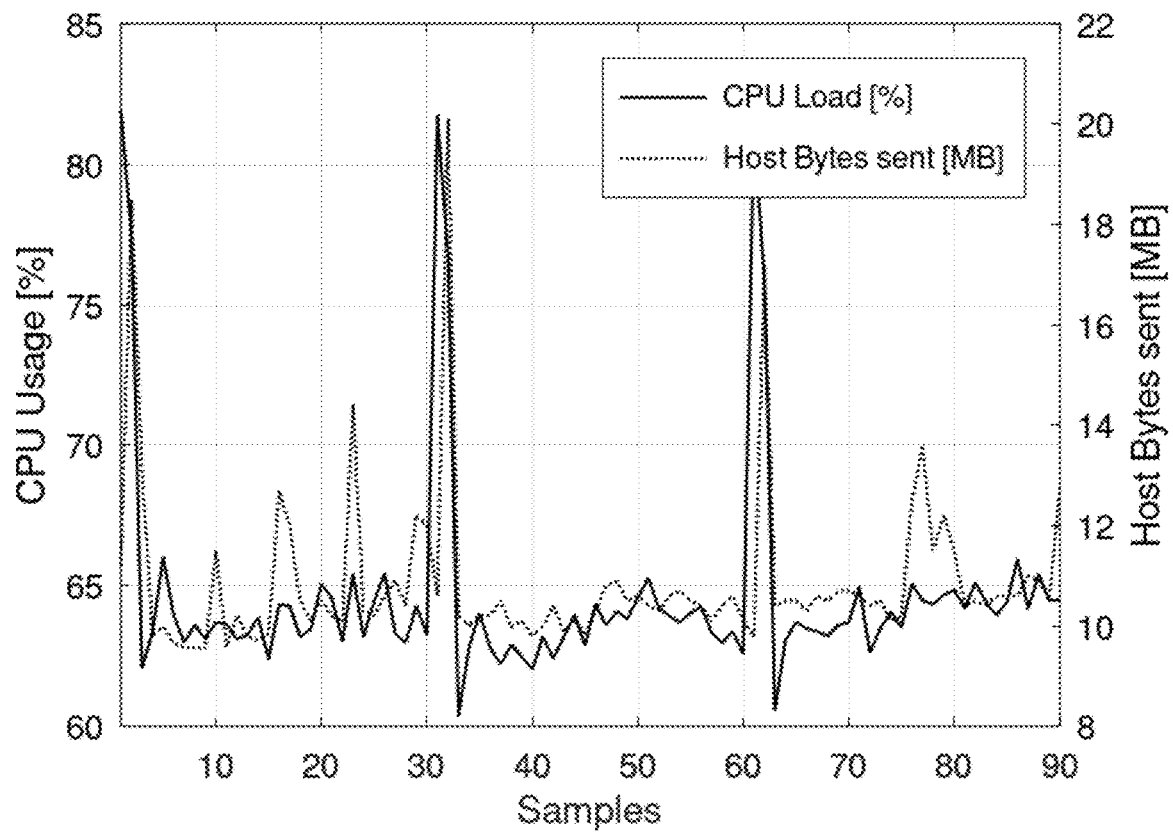
Figure 11:
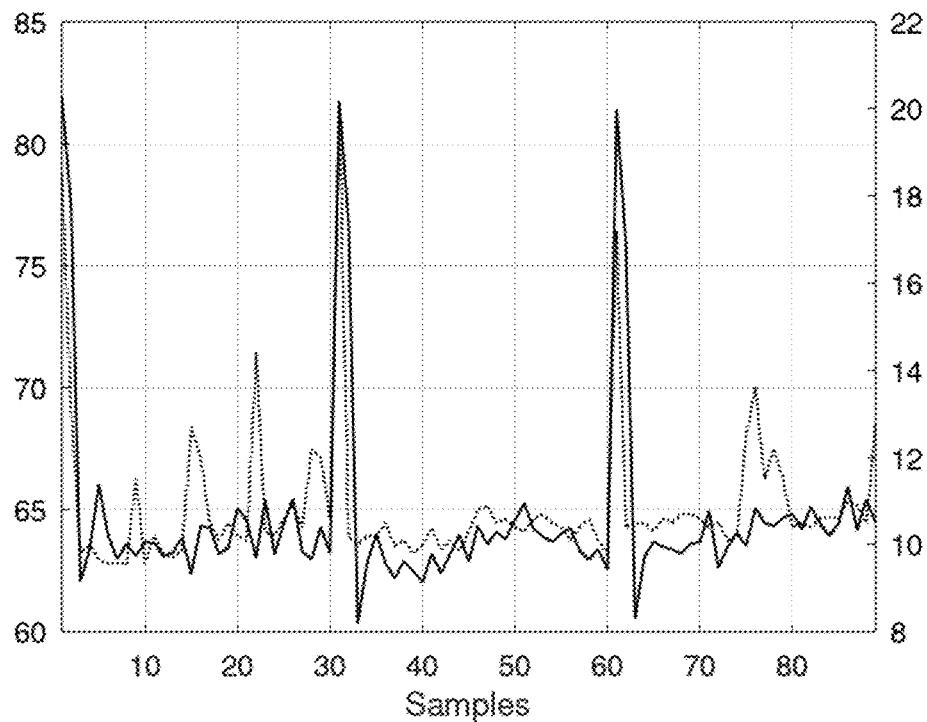
Figure 12:
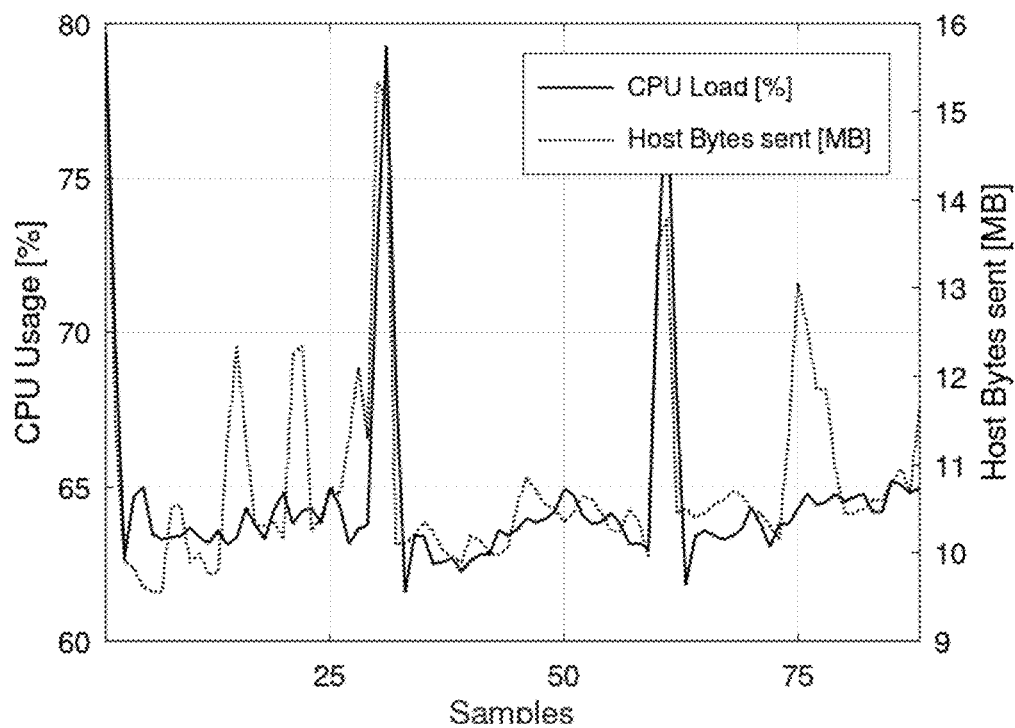
Figure 13:
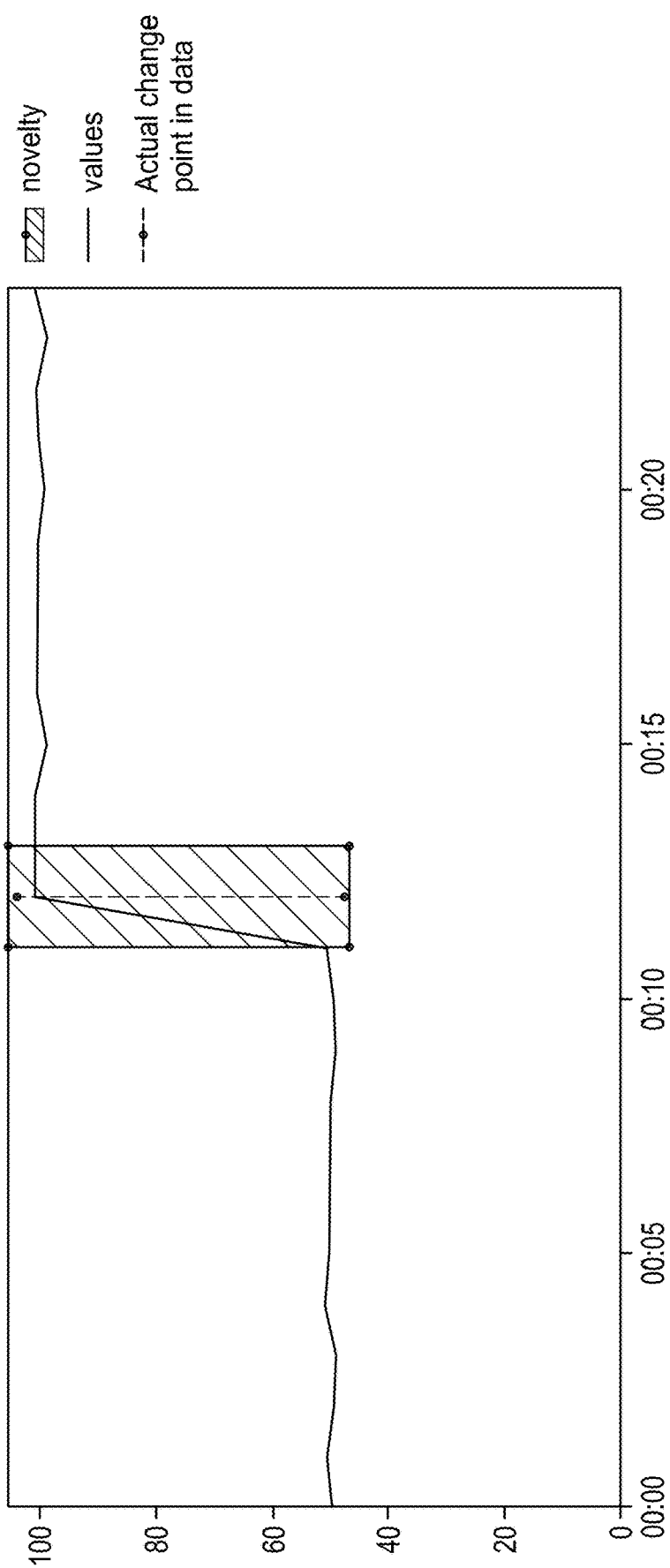
Figure 14:
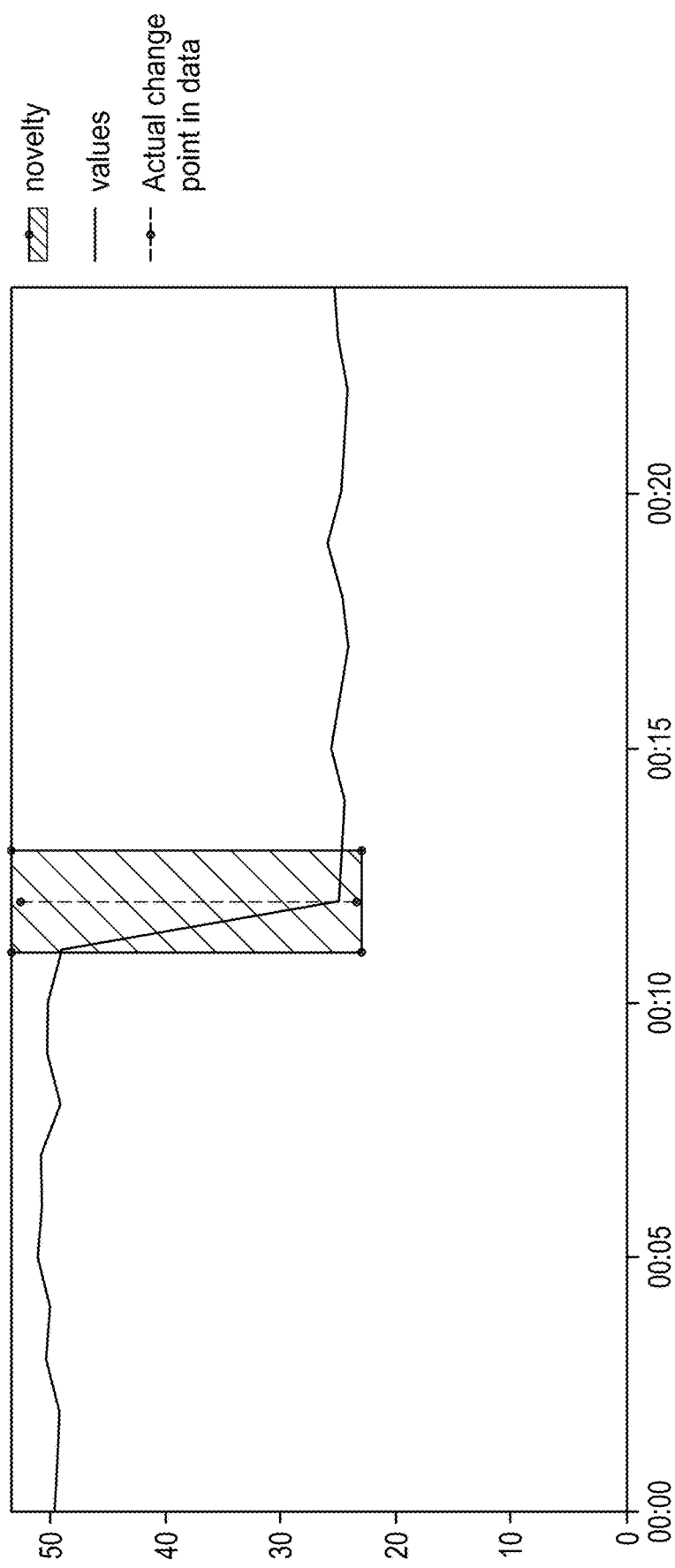
Figure 15:
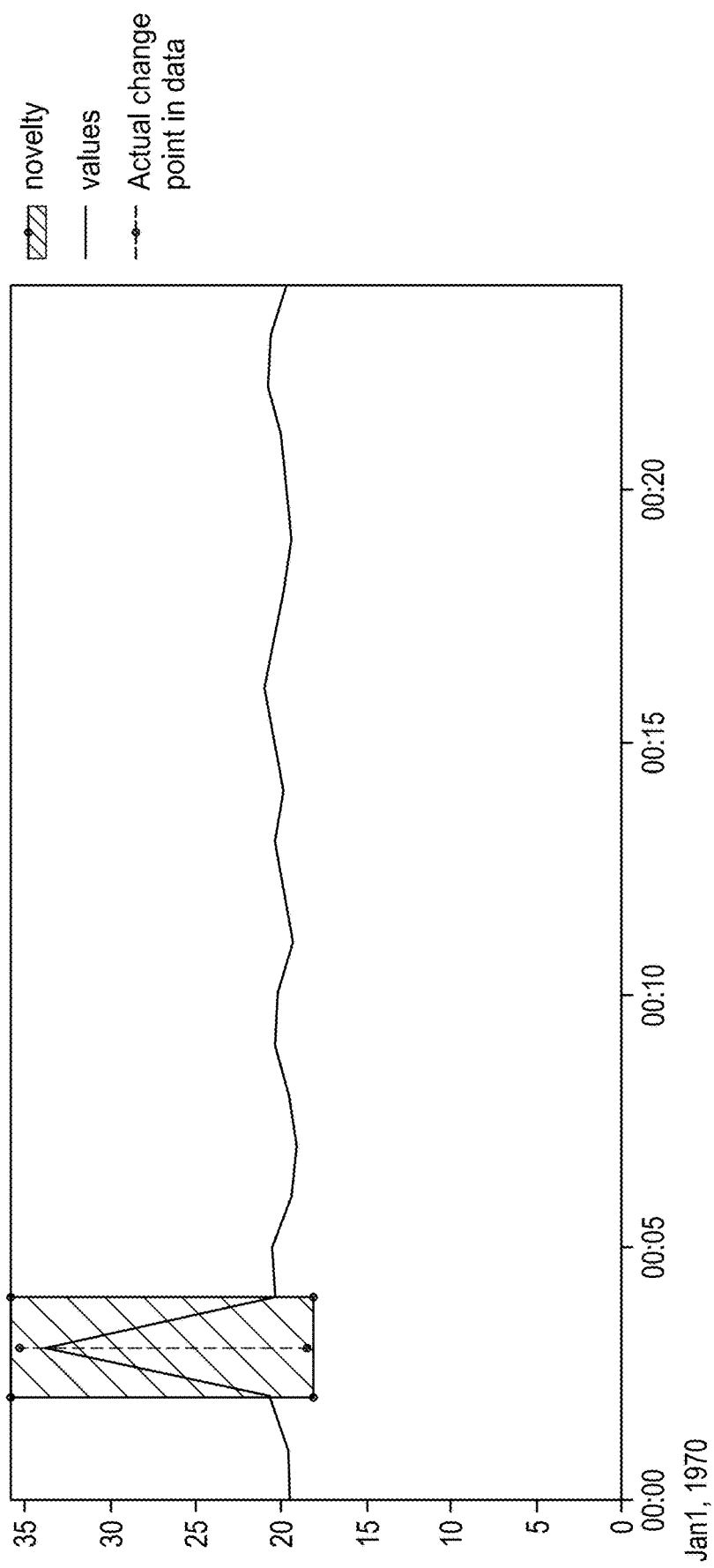
Figure 16:
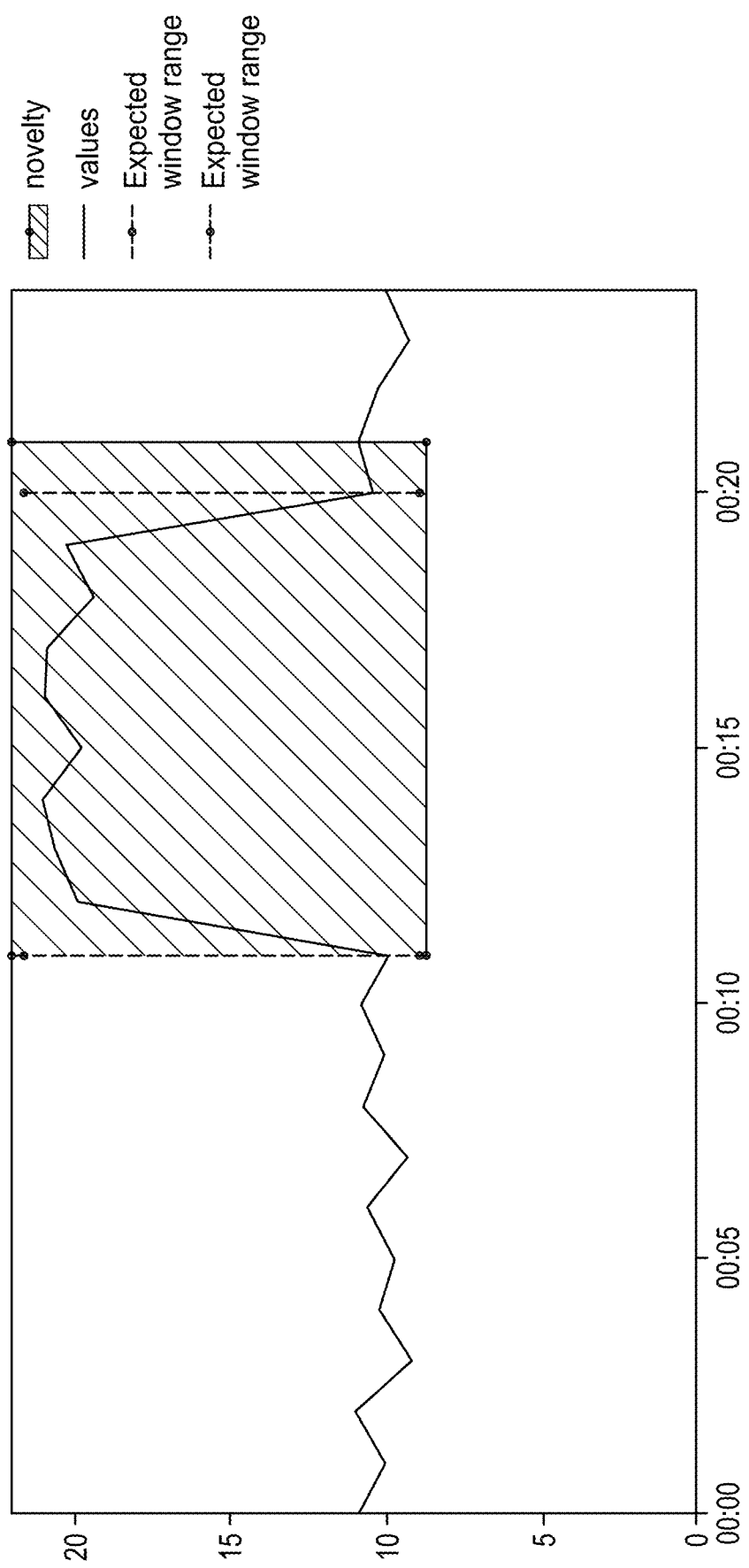
Figure 17:
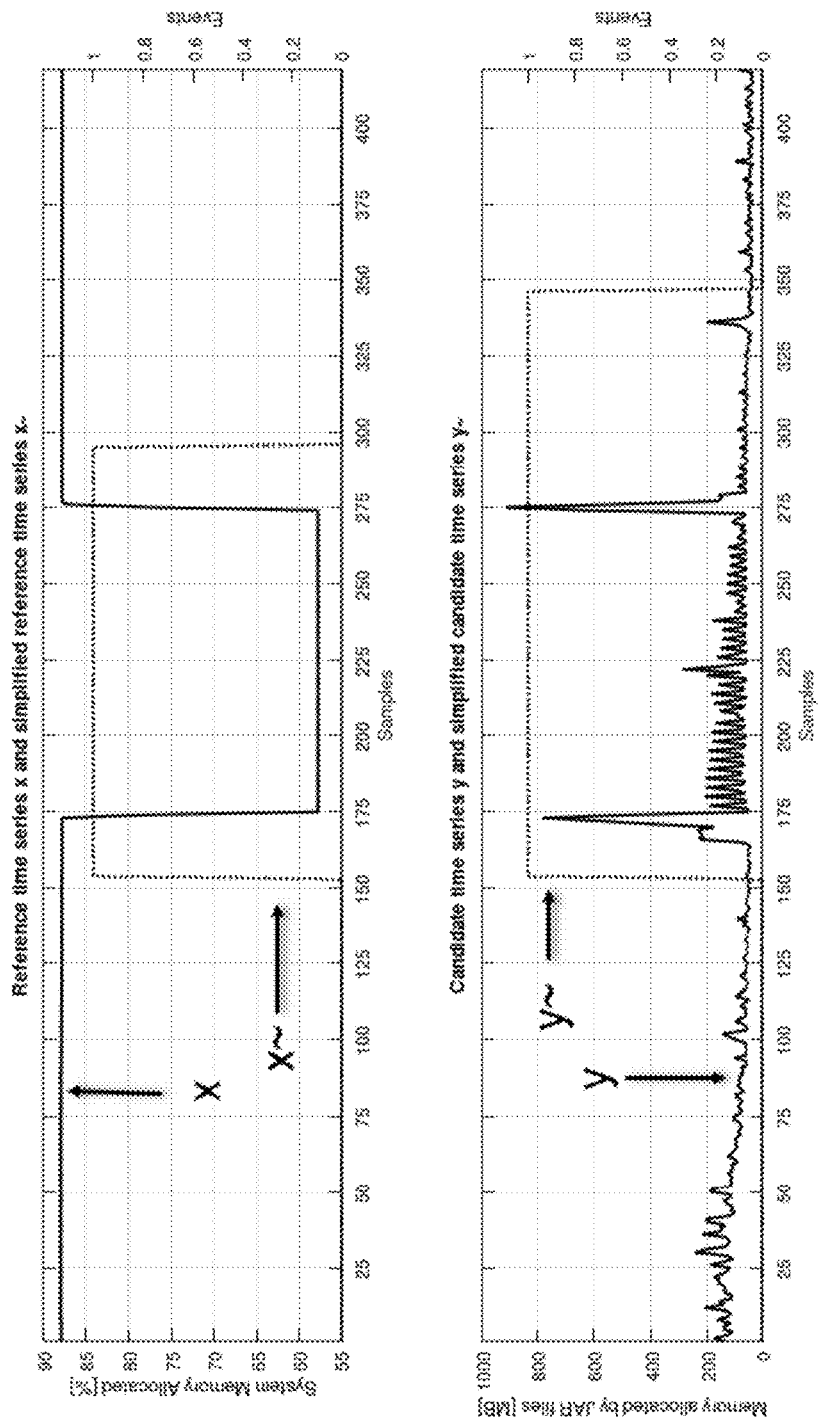
Figure 18:
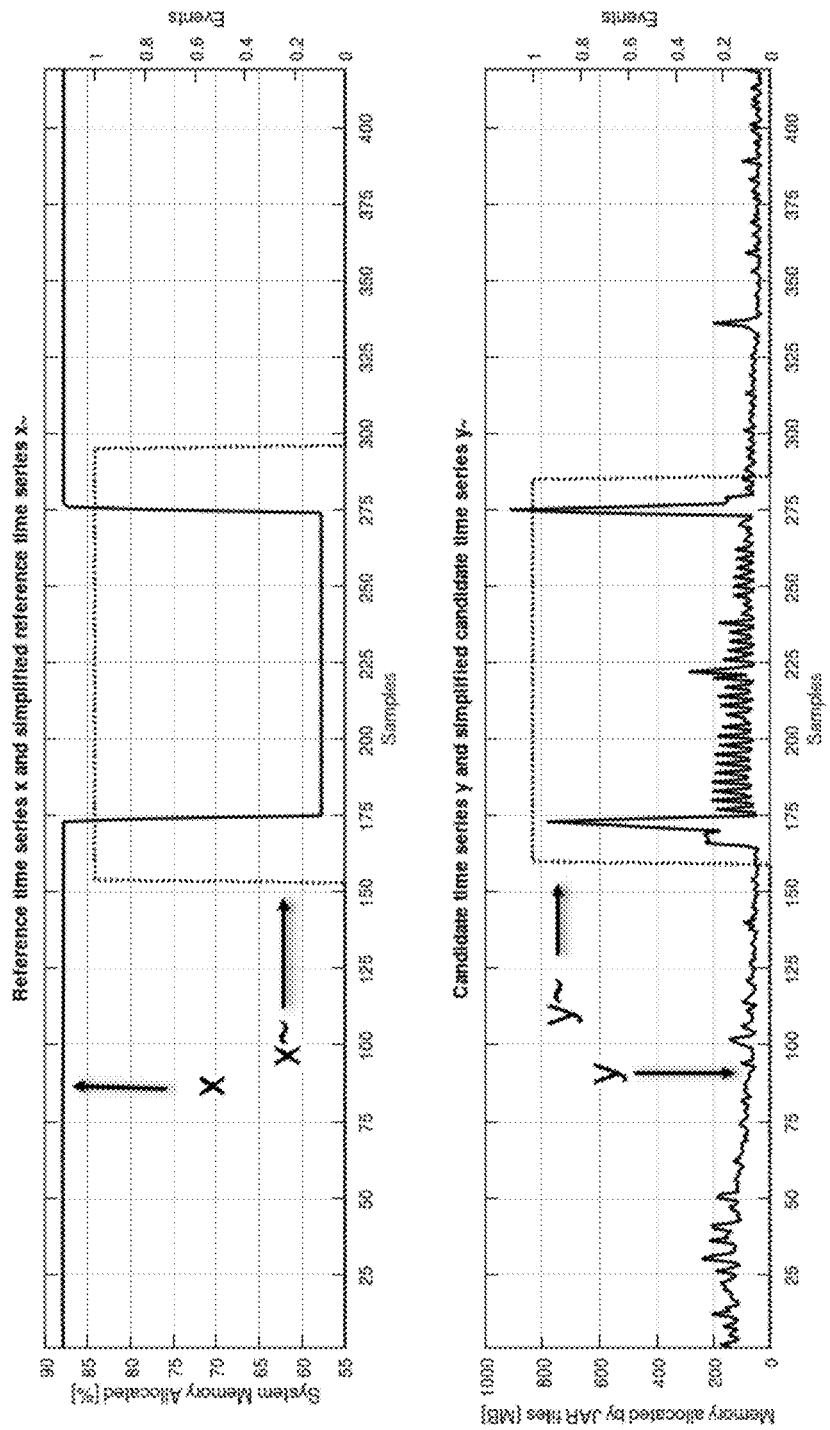
Figure 19:
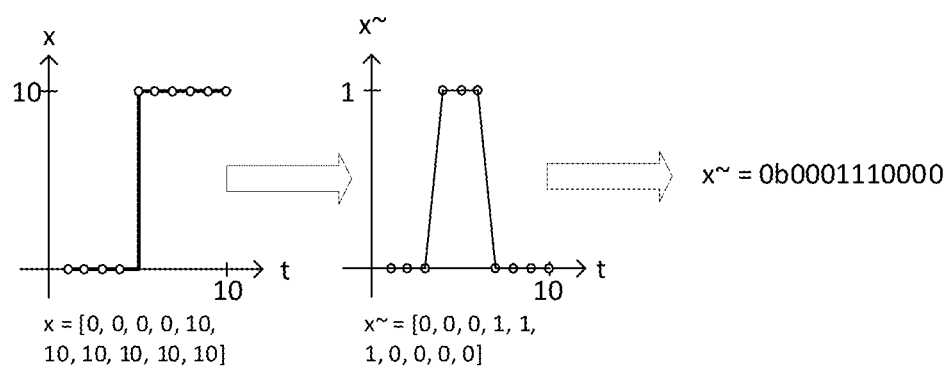
Figure 20:
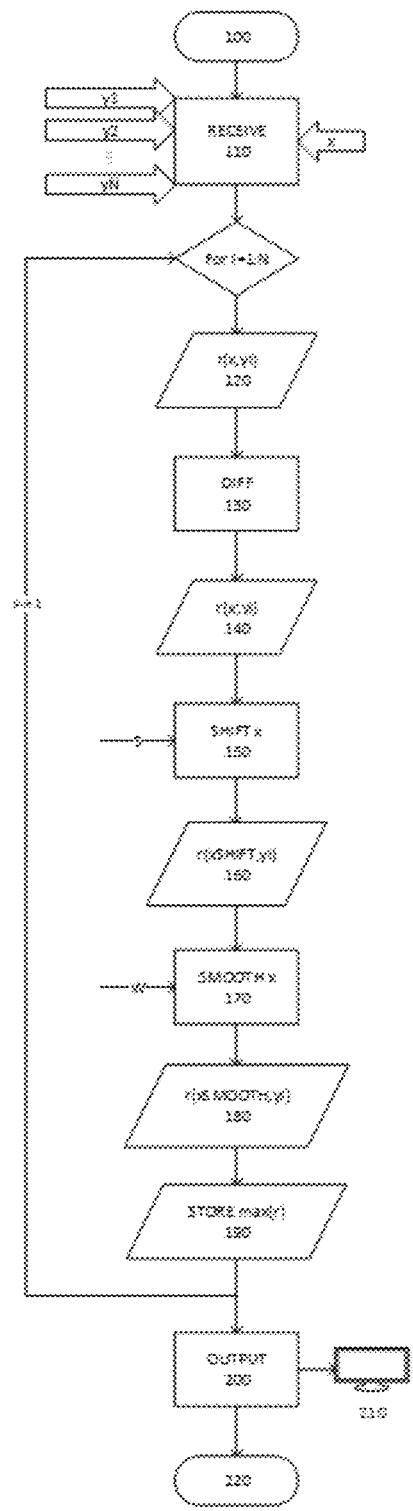
Figure 21:
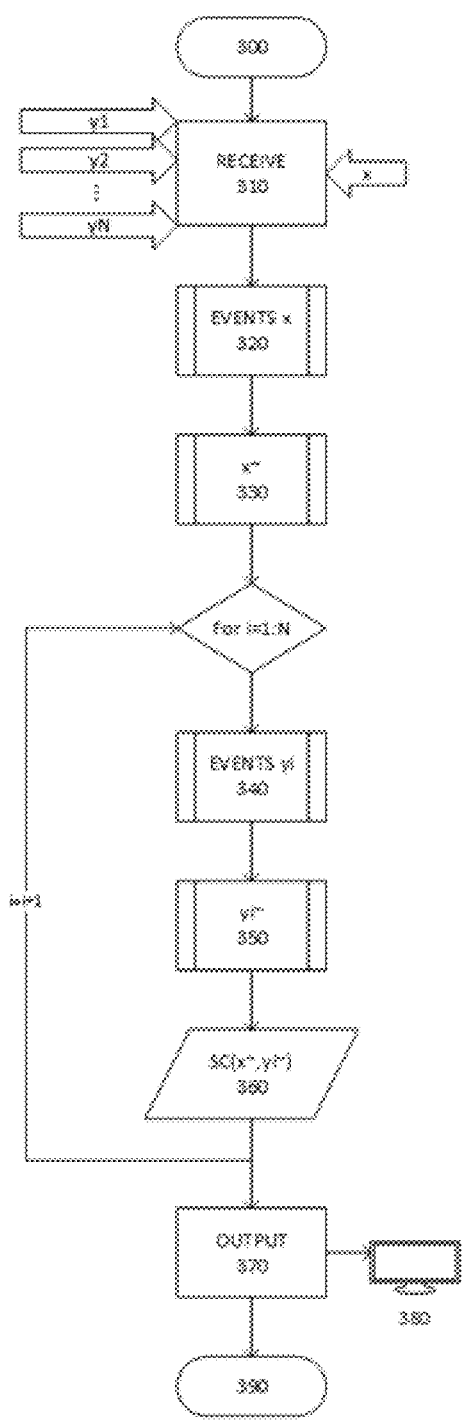
Figure 22:
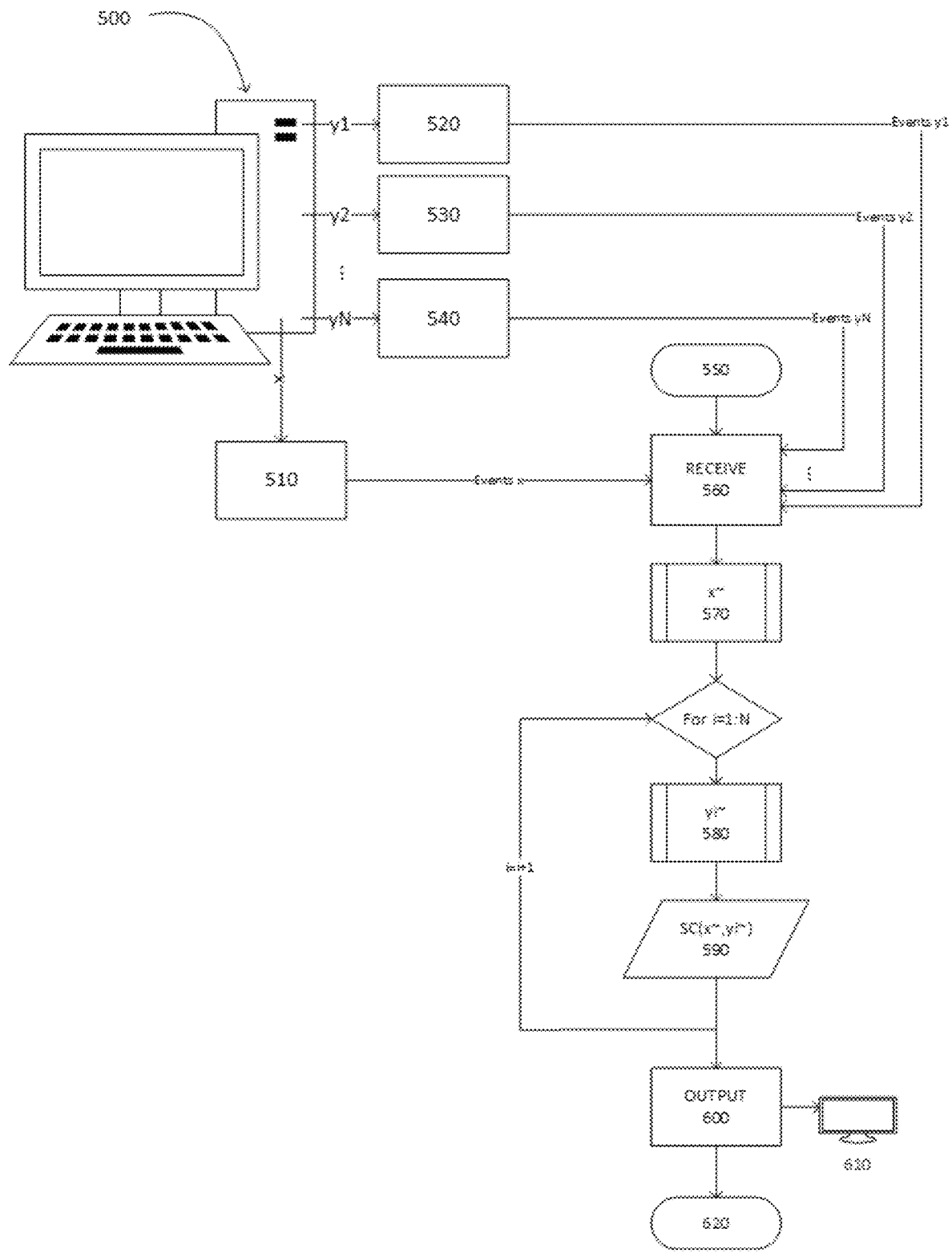
Figure 23:
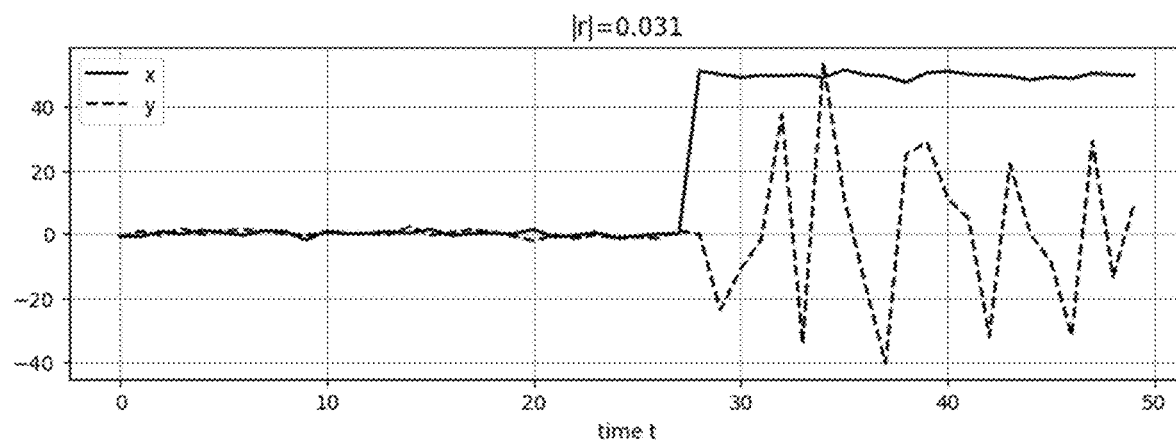
Figure 24:
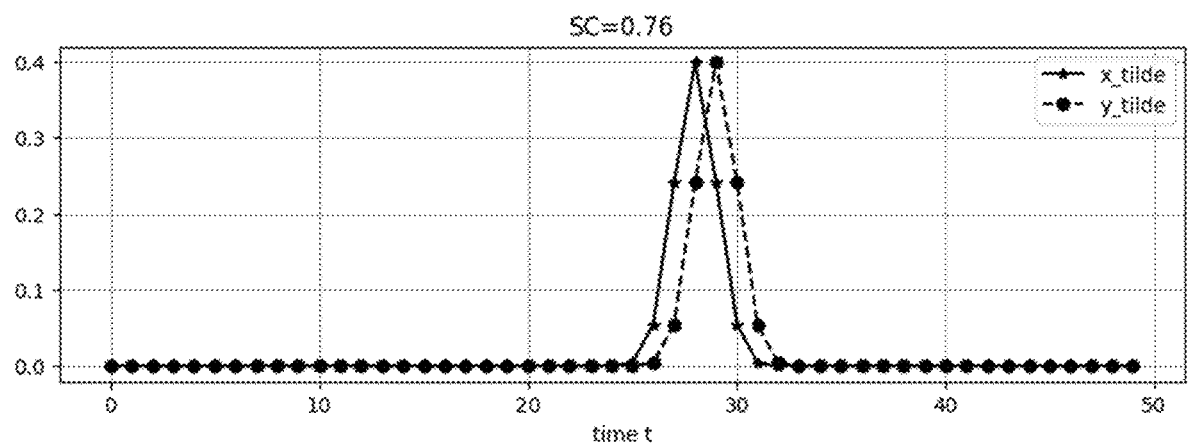
Figure 25:
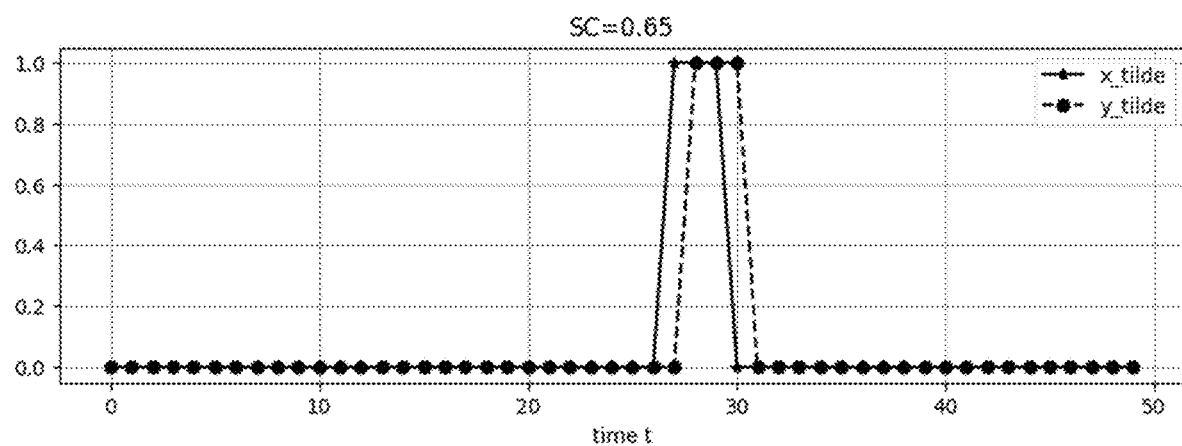
Figure 26:
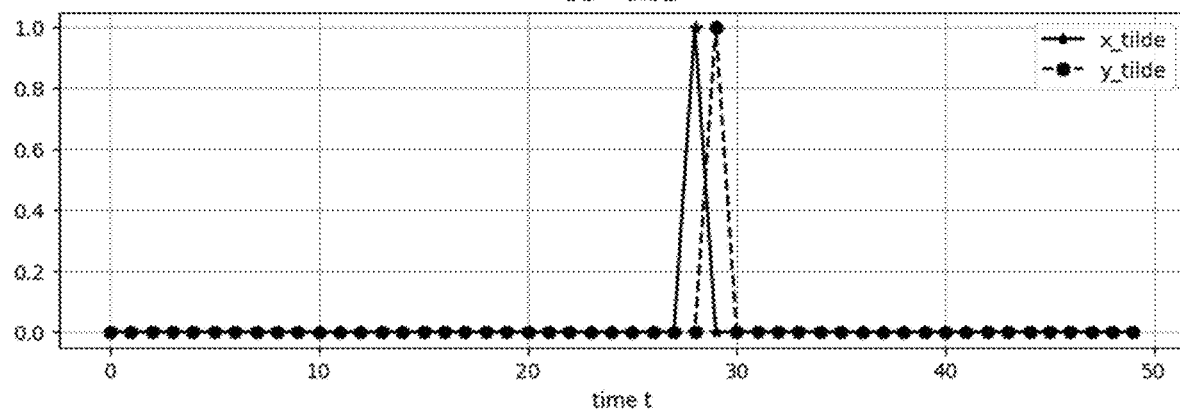

The accompanying drawings, which are incorporated in and constitute part of this specification, illustrate embodiments of the disclosure and together with the description, serve to explain the principles of the disclosure. The embodiments illustrated herein are presently preferred, it being understood, however, that the disclosure is not limited to the precise arrangements and instrumentalities shown, wherein:

FIG. 1 shows two time series with positive correlation and two time series with negative correlation, FIGS. 2 and 3 show the effect of shifting on the correlation, FIG. 4 shows the effect of differentiation on the correlation, FIG. 5 shows the effect of smoothing on the correlation, FIG. 6 shows two time series x, y of a first real-world example, FIGS. 7 and 8 show the differentiated time series of FIG. 6, FIG. 9 shows the differentiated, shifted and smoothened time series for the first real-world example, FIG. 10 shows two time series x, y of a second real-world example, FIG. 11 shows the shifted time series of FIG. 10, FIG. 12 shows the shifted and smooth time series for the second real-world example, FIGS. 13 and 14 show the identification of level changes, FIG. 15 shows the identification of a spike, FIG. 16 shows the identification of a plateau in a time signal, FIG. 17 shows the time series x, y and a first variant of the simplified time series $\tilde{x}$, $\tilde{y}$ in the first real-world example, FIG. 18 shows the time series x, y and a second variant of the simplified time series $\tilde{x}$, $\tilde{y}$ in the first real-world example, FIG. 19 shows the steps in the identification of an event in a time series and a binary representation of the time series comprising the event, FIGS. 20, 21 and 22 show flow diagrams for a $1^{st}$, $2^{nd}$, and $3^{rd}$ embodiment of the disclosure, respectively, FIG. 23 shows the time series x and y for a $12^{th}$ application example, and FIGS. 24, 25, and 26 show three variants of simplified time series $\tilde{x}$, $\tilde{y}$ for the $12^{th}$ application example.

DETAILED DESCRIPTION

Example embodiments will now be described more fully with reference to the accompanying drawings.

In a first application example, time series having a positive and a negative Pearson correlation coefficient r, respectively, are demonstrated. In the upper diagram of FIG. 1, a reference time series x and one candidate time series y are plotted. The samples for x and y read:

x=[0, 0, 0, 0, 1, 0, 0, 0, 0, 0]
y=[0.5, 0.5, 0.5, 0.5, 1, 0.5, 0.5, 0.5, 0.5, 0.5]

Both time series x and y are defined over a time t between 0 and 9, sampled once per minute, i.e. t=[0, 1, 2, 3, 4, 5, 6, 7, 8, 9]. The Pearson correlation coefficient r is defined as $$r = \frac{\sum_{i=1}^{n}(x_i - x_M)(y_i - y_M)}{\sqrt{\sum_{i=1}^{n}(x_i - x_M)^2}\sqrt{\sum_{i=1}^{n}(y_i - y_M)^2}}$$

where $x_M$, $y_M$ is the mean value of the reference time series x and the candidate time series y, respectively. Both time series x and y contain 10 samples, i.e. n=10. The mean value $x_M$=0.1; the mean value $y_M$=0.55. The Pearson correlation coefficient r between x and y is 1, i.e. an ideal positive correlation.

The lower diagram of FIG. 1 shows the same reference time series x as above but a different candidate time series y:

y=[0.5, 0.5, 0.5, 0.5, 0, 0.5, 0.5, 0.5, 0.5, 0.5]

Both x and y are defined over the time t as above. In this case, the Pearson correlation coefficient r between x and y is −1, i.e. an ideal negative correlation.

The effect of shifting is shown in a second application example, see FIG. 2. The reference time series x is identical to the $1^{st}$ application example, the candidate time series is y=[0.5, 0.5, 0.5, 0.5, 0.5, 0, 0.5, 0.5, 0.5, 0.5] (see the upper diagram of FIG. 2). In this case, the correlation coefficient r=0.1111, i.e. there is a low positive correlation between x and y. Next, x is shifted by 1 sample to the right such that it is defined between 1 and 10. As the shifted reference time series x and the (unshifted) candidate time series y are defined between 1 and 9, the correlation coefficient needs to be calculated accordingly. In this case, the Pearson correlation coefficient r is again −1.

FIG. 3 shows a third application example similar to FIG. 2, where the reference time series x is shifted by 1 sample to the left (herein also referred to shifting by −1 samples). After shifting x, the Pearson correlation coefficient r is again −1, i.e. an ideal negative correlation.

The effect of differentiation is shown in a $4^{th}$ application example, see FIG. 4. The reference time series x and the candidate time series y are shown in the top diagram of FIG. 4. x and y are:

x=[0, 0, 0, 0, 1, 1, 0, 0, 0, 0]
y=[0, 0, 0, 1, 0, −1, 0, 0, 0, 0]

There is a low negative correlation between x and y, as r is −0.0059. Next, the reference time series x is differentiated; y remains unchanged. The algorithm used for differentiating x is $x_{i-1}'=x_i-x_{i-1}$ for i between 2 and 10, such that x' is defined for t between 0 and 8. The differentiated reference time series x' is shown in the lower diagram of FIG. 4. After differentiation, there is an ideal positive correlation with r=1 for t between 0 and 8.

FIG. 5 shows the effect of noise and smoothing in a fifth application example. The top diagram shows the same x and y time series as in the lower diagram of FIG. 1. The middle diagram shows the x and y time series subjected to some random noise. The disturbed time series are $x_{Noisy}$=[0.116, 0.0913, 0.0463, 0.109, 1.16, −0.0533, 0.145, −0.0455, 0.0598, 0.0562] and $y_{Noisy}$=[0.418, 0.360, 0.640, 0.374, −0.0538, 0.415, 0.490, 0.481, 0.559, 0.473]. The Pearson correlation coefficient between $x_{Noisy}$ and $y_{Noisy}$ is $r=-0.89$. The noisy time series are subsequently smoothened by a sliding window having a width of 2 samples, such that $x_{Smoothed_{i-1}}=(x_{Noisy_i}+x_{Noisy_{i-1}})/2$ and $y_{Smoothed_{i-1}}=(y_{Noisy_i}+y_{Noisy_{i-1}})/2$. Due to smoothing, the smoothened time series are shortened by 1 sample, i.e. n=9. The correlation coefficient r of the smoothened time series $r=-0.97$. This proofs that the effect of noise on the correlation of time series can be—at least partially—mitigated by smoothing.

The 6$^{th}$ application example is more complex than the previous examples as the data was taken from a host in a real-world computer system. The reference time series x represents the memory used by applications on the system in percent and the candidate time series y represents the memory allocated in MB by running all Java processes spawned from the Java Archive (JAR) files. Both time series x, y are sampled once a minute, i.e. every 60 s. As can be seen in FIG. 6, the reference time series x drops around the 175$^{th}$ sample from around 88% to 58%. The candidate time series y raises around the 165$^{th}$ sample from around 50 MB to 782 MB and then drops down to some 50 MB. Around the 275$^{th}$ sample x raises from 58% to 88% and at around the same time, y raises from 63 MB to 912 MB and then drops back to around 60 MB. Although for reasons of brevity only one reference time series x and only one candidate time series y are investigated, it shall be analyzed whether there is a high similarity between x and y and whether the candidate time series y may have a (high) chance for causing the drop in x around the 175$^{th}$ sample and the increase in x around the 275$^{th}$ sample.

In a first step, the Pearson correlation coefficient r between the original time series x and y is calculated. It turns out that $r=-0.1017$, i.e. there is a low negative correlation between x and y. It is noted that r is commutative, i.e. r comes out the same between i) x and y or between ii) y and x.

In the next step, both x and y are differentiated by $x_{i-1}'=x_i-x_{i-1}$ and $y_{i-1}'=y_i-y_{i-1}$. The differentiated reference time series x' and y' (called xDiff and yDiff, respectively, in FIGS. 7 and 8) are displayed in FIG. 7 in separate graphs and in FIG. 8 in one graph. After differentiating x and y the Pearson correlation coefficient r between x' and y' is 0.3.

Next the differentiated reference time series x' is shifted by 1 sample to the left, i.e. $x_{i-1}'=x_i'$. It is noted that by shifting, the length of the differentiated and shifted reference time series x' decreases by 1. This is taken into account when computing r. The Pearson correlation coefficient between the shifted and differentiated reference time series x and the (unshifted) differentiated candidate time series y is $r=0.4125$.

Subsequently, both the differentiated and shifted reference time series x and the differentiated (unshifted) candidate time series y are smoothened by a sliding window having a width of 3. The resulting smoothened time series are displayed in FIG. 9. It is evident that the ripples between samples 175 and 275 are greatly reduced due to smoothing. The Pearson correlation coefficient between the differentiated, shifted, and smoothened time series is $r=0.482$.

As the differentiated, shifted, and smoothened time series displayed in FIG. 9 has the highest correlation coefficient, this combination is output if 0.482 is higher than a threshold t. In this case, the candidate time series y may be regarded to have a high chance/probability for being the root cause for the events in the reference time series x.

An overview of Pearson correlation coefficients r for different combinations of time series is given in the table below. The entry "x'àShift−1à Smoothing 3" in the table means that first the x signal was differentiated, then the differentiated x signal was shifted by 1 sample to the left (negative means shifted to the left) and finally the differentiated and shifted signal was smoothened by a sliding window having a width of 3. The other entries shall be understood accordingly.

TABLE 1

Comparison of different signal combinations for the 6$^{th}$ application example

| First signal | Second signal | r |
|---|---|---|
| x | y | −0.101671 |
| x' | y' | 0.296653 |
| x' à Shift −5 | y' | 0.0385844 |
| x' à Shift −4 | y' | −0.0986389 |
| x' à Shift −3 | y' | −0.142033 |
| x' à Shift −2 | y' | −0.0063977 |
| x' à Shift −1 | y' | 0.412457 |
| x' à Shift 1 | y' | −0.167154 |
| x' à Shift 2 | y' | −0.221352 |
| x' à Shift 3 | y' | 0.0226985 |
| x' à Shift 4 | y' | 0.00921464 |
| x' à Shift 5 | y' | −0.110765 |
| x'àShift −1 àSmoothing 2 | y' à Smoothing 2 | 0.475758 |
| x'àShift −1 àSmoothing 3 | y' à Smoothing 3 | 0.482186 |
| x'àShift −1 àSmoothing 4 | y' à Smoothing 4 | 0.40348 |
| x'àShift −1 àSmoothing 5 | y' à Smoothing 5 | 0.377124 |
| x' | y | 0.0823028 |
| x' à Shift −5 | y | −0.081978 |
| x' à Shift −4 | y | −0.050834 |
| x' à Shift −3 | y | −0.13026 |
| x' à Shift −2 | y | −0.244561 |
| x' à Shift −1 | y | −0.249574 |
| x' à Shift 1 | y | 0.321188 |
| x' à Shift 2 | y | 0.186857 |
| x' à Shift 3 | y | 0.0085901 |
| x' à Shift 4 | y | 0.0268743 |
| x' à Shift 5 | y | 0.0343086 |
| x'àShift −1 àSmoothing 2 | y à Smoothing 2 | −0.215278 |
| x'àShift −1 àSmoothing 3 | y à Smoothing 3 | −0.161326 |
| x'àShift −1 àSmoothing 4 | y à Smoothing 4 | −0.11929 |
| x'àShift −1 àSmoothing 5 | y à Smoothing 5 | −0.103198 |
| x | y' | −0.0487066 |
| x à Shift −5 | y' | 0.0055319 |
| x à Shift −4 | y' | 0.0172106 |
| x à Shift −3 | y' | 0.0343899 |
| x à Shift −2 | y' | 0.035063 |
| x à Shift −1 | y' | −0.0143058 |
| x à Shift 1 | y' | −0.0294714 |
| x à Shift 2 | y' | −0.00208292 |
| x à Shift 3 | y' | −0.00441865 |
| x à Shift 4 | y' | −0.00617622 |
| x à Shift 5 | y' | 0.0072125 |
| x àShift −1 àSmoothing 2 | y' à Smoothing 2 | −0.0512967 |
| x àShift −1 àSmoothing 3 | y' à Smoothing 3 | −0.0471414 |
| x àShift −1 àSmoothing 4 | y' à Smoothing 4 | −0.0384303 |
| x àShift −1 àSmoothing 5 | y' à Smoothing 5 | −0.0330818 |

Of all the combinations above, only the combination with the highest absolute value of r (i.e. the combination x'àShift−1àSmoothing 3 and y' àSmoothing 3 resulting in r=0.482) is output. In case of more than one candidate time series, the candidate time series are output in order of the maximum absolute value of the Pearson correlation coefficients r.

A 7$^{th}$ application example shows the relationship between CPU usage as a reference time series x and the number of Bytes sent between two sampling intervals by a host in a computing system as a candidate time series y. Both x and y comprise 90 samples, the sampling time is 180 s=3 min. The original time series x and y are displayed in FIG. 10. Different from the 6$^{th}$ application example, already the original (i.e. unchanged) time series x and y correlate quite well with r=0.497. In the first step, the reference time series x is shifted by different numbers of samples and for each combination, the Pearson correlation coefficient r is calculated (see next table):

TABLE 2

Comparison of different signal combinations for the 7$^{th}$ application example

| First signal | Second signal | r |
|---|---|---|
| x àShift −5 | y | −0.0831691 |
| x àShift −4 | y | −0.0569982 |
| x àShift −3 | y | 0.0721616 |
| x àShift −2 | y | 0.057569 |
| x àShift −1 | y | −0.11876 |
| x àShift 1 | y | 0.718967 |
| x àShift 2 | y | −0.00278243 |
| x àShift 3 | y | −0.0682034 |
| x àShift 4 | y | −0.11278 |
| x àShift 5 | y | −0.117273 |

As can be seen in Tab. 2, shifting by 1 sample gives the highest correlation. The shifted x signal and the y signal are shown in FIG. 11.

Next, different smoothing filters, here sliding window filters having different widths, are applied to both the shifted x signal and the y signal. This results in the following Pearson correlation coefficients r:

TABLE 3

Comparison of different signal combinations for the 7$^{th}$ application example

| First signal | Second signal | r |
|---|---|---|
| x àShift 1àSmoothing 2 | y àSmoothing 2 | 0.779428 |
| x àShift 1àSmoothing 3 | y àSmoothing 3 | 0.760902 |
| x àShift 1àSmoothing 4 | y àSmoothing 4 | 0.745106 |
| x àShift 1àSmoothing 5 | y àSmoothing 5 | 0.749494 |

It turns out that smoothing by a sliding window having a width of 2 results in the highest correlation between the 1$^{st}$ and 2$^{nd}$ signals. As there is a high correlation between the first and second signals x and y, y may have a high chance for being the root cause of the events in the reference time series x. The shifted and smoothened time series x, y are displayed in FIG. 12.

In an 8$^{th}$ application example, the detection of level changes is shown. In a time series ts=[49.798, 50.434, 49.561, 49.165, 50.939, 50.127, 50.288, 50.153, 49.950, 49.244, 49.627, 50.472, 100.81, 100.77, 100.89, 99.050, 100.47, 100.34, 100.25, 100.27, 99.252, 100.25, 100.57, 99.014, 100.84] of 25 values, a level change is detected to be initiated at index position 11 and finished at position 13. The middle position of the level change is at index position 12 (see FIG. 13). The confidence that the detected event is an actual event is 0.9979. The detection of level changes works for both rising and falling edges, see FIG. 14. In this case, the level change is detected to be initiated at index position 11 and finished at position 13. The middle position of the level change is at position 12 (see FIG. 14). The confidence is 0.78687.

The level changes are detected using the PELT algorithm with an incrementally trained constant timeseries model with an overall time complexity of O(n).

In a 9$^{th}$ application example, the detection of spikes is shown. In a time series ts=[19.52, 19.59, 20.62, 34.18, 20.20, 20.45, 19.37, 19.11, 19.54, 20.31, 20.12, 19.30, 19.86, 20.33, 19.84, 20.26, 20.93, 20.36, 19.78, 19.37, 19.69, 20.02, 20.78, 20.55, 19.63] of 25 values, a spike is detected to be initiated at index position 2 and finished at position 4. The middle position of the spike is at position 3 (see FIG. 15). The confidence is 0.972. The detection works for spikes for which the peak is higher or lower than a base value.

To efficiently detect spikes in time series, a Hampel-Filter may be applied (e.g. see https://www.mathworks.com/help/dsp/ref/hampelfilter.html).

In a 10$^{th}$ application example, the detection of plateaus is shown. In a time series ts=[10.8, 10.0, 10.9, 9.16, 10.2, 9.75, 10.6, 9.3410.7, 10.0, 10.8, 9.95, 19.8, 20.5, 20.9, 19.7, 20.9, 20.8, 19.3, 20.2, 10.4, 10.8, 10.3, 9.26, 9.99] a plateau is detected to be initiated at index position 11 and finished at position 20 (see FIG. 16). The confidence is 0.985.

For plateau detection a PELT algorithm is used with an incrementally trained constant time series model in combination with post processing of the detected individual change points, yielding an overall time complexity of O(n).

Note that in FIGS. 13-16 events are called "novelty" in the respective legends. This term is used synonymously for "event" in the description.

In an 11$^{th}$ application example, the reference time series x and the candidate time series y as introduced in the 6$^{th}$ application example are used to identify significant events in these time series. As displayed in FIG. 17, in the reference time series x a plateau was identified (see top graph "x~" displaying the simplified reference time series x̃). The identified event starts at index position 154 and ends at index 295. The function having a rising edge and a falling edge being added to an initially empty time series x̃ is a step having a height of 1. In the candidate time series y three events were identified, see the 1$^{st}$ peak around index 175, the second peak at index 275 and the 3$^{rd}$ peak around index 338. In a first variant of the identification of significant events, all three events are combined into one event, starting at index 154 and ending at index 345. The function being added to an initially empty time series ỹ is a step having a height of 1. Computing the Pearson correlation coefficient r between x̃, ỹ yields r=0.77, i.e. a high positive correlation. It is noted that instead of calculating the Pearson correlation coefficient r, the similarity between x̃, ỹ can also be determined by calculating the so-called Levenshtein distance or Edit distance. Although these distances were originally introduced to determine the similarity of strings, they can be applied to simplified time series, essentially consisting of zeros and ones. The edit distance ED between x̃, ỹ is 51. Therefore, the similarity coefficient $$SC = 1 - \frac{ED(\tilde{x}, \tilde{y})}{\max(\text{length}(\tilde{x}), \text{length}(\tilde{y}))}$$

between the simplified time series x̃, ỹ, is 0.88.

In a second variant of the identification of significant events, in the candidate time series y only the 1$^{st}$ peak around index 175 and the second peak at index 275 were identified and these events were combined into a single event, starting at index 160 and ending at index 285 (see FIG. 18). The function being added to an initially empty time series ỹ is again a step having a height of 1. Computing the Pearson correlation coefficient between x̃, ỹ yields r=0.92, i.e. a high positive correlation.

FIG. 19 shows the steps in transforming a single time series x comprising 10 floating point values, where each value is stored as a double taking up 8 Bytes, into a simplified time series x̃. In the time series one level change/step event was identified beginning at index 4 and ending at index 6. The event is depicted in the middle graph. The event is then transformed into a bit array having a length of 10 bits, where the absence of an event is represented by zero and the presence of an event is represented by 1. By doing so, the data is compressed by a factor of 64. Even if the time series were stored using single precision floats, the compression factor would still be 32. The representation of time series by bit arrays is, however, not just beneficial in terms of storage/RAM, but also for efficiently computing the Pearson correlation coefficient r or other similarity coefficients, such as the Edit Distance.

The main steps in performing the disclosed methods according to a first embodiment of the disclosure is depicted in FIG. 20, and according to a second embodiment of the disclosure is depicted in FIG. 21.

In the scheme of FIG. 20, after starting the method 100 on a client's computer or on a remote computing environment, e.g. the cloud, one reference time series x and at least one candidate time series, here N candidate time series y1 . . . yN, are received 110. In an optional, preliminary step, all the time series x, y1 . . . yN are checked for compliance with formal requirements. First it is checked whether the time series contain missing data (also known as NaN entries). Then it is checked whether the time series have the same length, i.e. contain the same number of samples. Finally, it is checked whether the time series were sampled with the same sampling frequency. The order of these checks is irrelevant. In addition, these checks can be performed for all received time series x, y1 . . . yN at once, or individually within the loop before the $1^{st}$ correlation coefficient r is calculated in step 120. If any of these checks indicates a problem, the user is asked to remedy these issues, or an automatic remediation of the respective time series is performed. In step 120, the Pearson correlation coefficient r or another correlation coefficient is calculated between the reference time series x and the first candidate time series y1. In step 130 at least one time series x, y1, here the reference time series x, is differentiated. In step 140, r is calculated between the differentiated reference time series x' and y1. Next, at least one of the reference time series x or the x' are shifted by S samples. In this case, the reference time series x is shifted by −2, −1, 1, and 2 samples (step 150). In step 160, the correlation coefficient r is calculated between all shifted time series x, x' and y1. In step 170, smoothing of the time series is done. In this example it is assumed that only x is smoothened. The smoothing can be performed by sliding windows having different widths W. In step 180 the correlation coefficient is calculated between the smoothened reference time series x and y1. In step 190, the maximum of the absolute value of the correlation coefficient r is stored and the next candidate time series y2 is investigated. This is repeated until all candidate time series y1 . . . yN are processed.

Finally, in the event the value of a correlation coefficient exceeds a predetermined threshold, an occurrence of a computing event similar to the reference computing event embodied in the corresponding reference time series is reported as indicate at step 200. In one embodiment, all of the candidate time series having a correlation coefficient that exceeds the threshold are reported. In this embodiment, the candidate time series can be ordered based on the value of the correlation coefficient from highest to lowest. In some embodiments, a root cause for an abnormality in the computing environment is identified as the candidate time series having similarity metric with highest value amongst the plurality of candidate time series. For example, assume the response time for a service of an app goes up unexpectedly. In the example, the reference time series is indicative of the unexpected increase in response time. The candidate time series may be indicative of other computing events occurring in the computing environment, including incoming network traffic and free disk capacity. While analyzing the candidate time series, the time series for the incoming network traffic is very similar; whereas the time series for the free disk space is dissimilar. One possible explanation is that the response time goes up due to high incoming network traffic, possibly caused by a denial of service attack on the computer system. In this case, the incoming network traffic is identified as the root cause for the higher response time. This example is merely illustrative of how the claimed technique can be used to identify root causes for abnormalities occurring in the computing environment.

Another application example comprising the identification of events in both the reference time series x and the candidate time series y1 . . . yN is shown in FIG. 21. After starting the method 300, receiving the time series in step 310, and performing optional formality checks, in step 320 the events in the reference time series x are identified making use of basically well-known algorithms for the detection of level changes, spikes, plateaus etc. This results in a simplified reference time series x̃ (in FIG. 21 printed as x~), step 330. Next, the events in the $1^{st}$ candidate time series y1 are identified in step 340. The same algorithms can be used as in step 320, such that the simplified candidate time series $\widetilde{y1}$ (in the figure printed as yN~ for N=1) is established in step 350. Following this, the similarity coefficient SC between x̃ and $\widetilde{y1}$, e.g. the Pearson correlation coefficient, between these time series, is calculated in step 360. This is repeated for all candidate time series y1 . . . yN. Finally in step 370, the candidate time series y1 . . . yN for which |SC|≥t are output in order of the maximum similarity coefficient SC found in step 360. By doing so, the candidate time series y1 . . . yN having the highest chance/probability or chance to being the root cause for the events comprised in the reference time series x are being presented to the client. Note that it is not necessary to identify the events in the time series x and y1 . . . yN after starting the method in step 300. It would be possible to identify the events shortly after logging the data and to store and evaluate the events only. This reduces the amount of data stored and data transmitted for analysis significantly. Such an embodiment is shown in FIG. 22.

In FIG. 22, a computer 500 is equipped with various sensors detecting one reference time series x and several candidate time series y1 . . . yN. In one example, software agents instrumented in a monitored software application executing on the computer captures performance monitoring data or other types of data and constructs a time series from the captured data. It is readily understood that the performance monitoring data may be captured across multiple computers in a distributed computing environment. The performance monitoring data may be analyzed at the computer 500 or sent across a network to a remote monitoring server for analysis.

Next, events in the reference time series x are identified in block 510 by running one of the previously mentioned or other well-known algorithms for the identification of events. Analogue steps are taken for the candidate time series y1 . . . yN in blocks 520 . . . 540. The identified events could then be transmitted across the network to the remote monitoring server implementing the method for identifying a candidate time series y having a high chance/probability for causing an event comprised in a reference time series x, which is started in block 550. In block 560, the events are received. In step 570, a simplified reference time series x̃ is constructed. Likewise, in step 580, simplified candidate time series ỹ$_i$ are constructed. In step 590, the similarity coefficient SC is calculated between x̃ and the i-th candidate time series ỹ$_i$. In step 600, the candidate time series y1 ... yN are output in order of the maximum similarity coefficient SC found in steps 590.

A 12$^{th}$ application example is illustrated in FIGS. 23-26. The Python code for producing a reference time series x and a candidate time series y is:

```
import numpy as np
from matplotlib import pylab as plt
# a time series with a level change
x = np.array([-0.68, -0.87, 0.71, -0.13, 1.14, 0.34,
-0.47, 0.97, 0.79, -1.99, 0.83, 0.08,
0.17, 0.68, 0.25, 1.41, -0.58, 0.08, 0.22, 0.01,
1.37, -1.09, -0.51, 0.45, -1.27, -0.71, -0.03,
-0.02, 51.17, 50.16, 49.23, 49.79, 49.67, 50.02,
49.12, 51.54, 50.05, 49.54, 47.66, 50.67,
51.12, 50.14, 49.92, 49.53, 48.45, 49.39,
48.86, 50.44, 50.06, 49.82])
# a time series with an increase in variance
y = np.array([-1.14, 0.78, -0.55, 1.65, -0.24, 1.03,
1.25, 0.98, -0.05, -0.53, 0.41, -0.02,
0.01, -0.26, 2.48, -0.42, 0.37, 1.35, 0.52, -0.69,
-2.2, -0.36, -1.43, -0.27, -1.43, -1.0,
-1.42, 1.0, -0.19, -23.7, -10.8, -1.8, 37.8, -34.2,
54.0, 11.7, -15.3, -40.5, 25.2, 29.1, 11.4,
5.1, -32.1, 22.2, -0.3, -8.7, -31.8, 29.4,
-13.5, 9.6])
n = len(x);
t = np.arange(n);
```

As can be seen in FIG. 23, the level of x raises from 0 to 50 between the 25$^{th}$ and the 30$^{th}$ sample, whereas approximately around that time the level of variance of y increases significantly. The Pearson correlation coefficient between x and y is low with r=0.031.

The change points in the time series x and y are identified using the ruptures package https://pypi.org/project/ruptures:

```
# use the ruptures package to detect the change points
import ruptures as rpt
# lets use the PELT search algorithm and a normal distribution
model to detect the change points in x and y
# Note: in the ruptures package the last element of the found
change points marks the end of the time series.
x_events = rpt.Pelt(model="normal", min_size=1,
jump=1).fit(x).predict(pen=np.std(x))[:-1]
print(f"{x_events=}")
y_events = rpt.Pelt(model="normal", min_size=1,
jump=1).fit(y).predict(pen=np.std(y))[:-1]
print(f"{y_events=}")
```

Doing this, one change point for the time series x was identified at position 28 and one change point for y at position 29.

Next, three variants for simplified time series x̃, ỹ are constructed featuring a bell-shaped curve in the first variant and two step-function in the 2$^{nd}$ and 3$^{rd}$ variant. Both the bell-shaped curve and the step-functions are examples of functions having a rising edge and a falling edge around the change points. For all variants, a function make_simplified_series is defined as follows:

```
# make a simplified series by putting around each found
changepoint a kernel (some kind of "bump")
def make_simplified_series(events, kernel, n):
smoothed = np.zeros(n)
smoothed[events] = 1
smoothed = np.convolve(smoothed, kernel[in], 'same')
return smoothed
```

In the first variant, the "kernel" featuring the rising and the falling edge is given as

```
# a kernel could e.g. be computed from the probability
density function (pdf) of a normal distribution
from scipy.stats import norm
kernel = np.round(norm( ).pdf(np.arange(-10, 10)), 3)
kernel = kernel[kernel > 1e-5]
list(kernel)
``` resulting in the kernel [0.004, 0.054, 0.242, 0.399, 0.242, 0.054, 0.004]. This kernel basically represents samples of a Gaussian bell curve.

The kernel is used to build the simplified time series x̃, ỹ:

```
# let's use this kernel to replace each event
kernel = np.array([[0.004, 0.054, 0.242, 0.399, 0.242, 0.054, 0.004])
# create simplified series x_tilde and y_tilde
x_tilde =make_simplified_series(x_events, kernel, n)
y_tilde =make_simplified_series(y_events, kernel, n)
```

The simplified time series x̃, ỹ are depicted in FIG. 24 and the Pearson correlation coefficient r as one example of a similarity coefficient SC between x̃, ỹ is 0.76.

In the second variant, a simpler kernel [1, 1, 1] is used, the simplified time series x̃, ỹ are depicted in FIG. 25 and the Pearson correlation coefficient r between x̃, ỹ is 0.65.

In a third variant, the simplest possible kernel [1] is used. The corresponding simplified time series x̃, ỹ are depicted in FIG. 26. In this case, the Pearson correlation coefficient is low with r=0.02. Alternatively to the Pearson correlation coefficient, the similarity coefficient SC based on the Edit distance can be used. The edit distance between x̃, ỹ is 2 and SC is 0.96.

Note that identical leading and/or trailing portions of the strings x̃, ỹ can be omitted, where the shortened strings are called x̃*, ỹ*. Shortening x̃, ỹ greatly improves the efficiency of computing ED. It was found that SC for the shortened strings is defined as $$SC = 1 - \frac{ED[\tilde{x}*, \tilde{y}*]}{\max[\text{length}(\tilde{x}), \text{length}(\tilde{y})]},$$

i.e. that shortening the strings by removing identical portions of the strings does not change neither ED nor ED. Removing the identical portions of the strings x̃, ỹ yields the shortened strings:

$$\tilde{x}* = [1, 0]$$

$$\tilde{y}* = [0, 1]$$

In this case, ED comes out as 2 and SC is again 0.96.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for identifying an occurrence of a computing event in a distributed computing environment, comprising:
   a) providing a reference time series indicative of a reference computing event in the distributed computing environment;
   b) identifying, by one or more computer processors, one or more changes in the reference time series;
   c) constructing, by the one or more computer processors, a simplified reference time series from the reference time series, where the one or more changes are retained in the simplified reference time series, and remaining data points in the reference time series are set to zero in the simplified reference time series;
   d) receiving a candidate time series comprised of data captured in the distributed computing environment;
   e) identifying, by the one or more computer processors, one or more changes in the candidate time series;
   f) constructing, by the one or more computer processors, a simplified candidate time series from the candidate time series, where the one or more changes are retained in the simplified candidate time series, and remaining data points in the candidate time series are set to zero in the simplified candidate time series, wherein constructing a simplified candidate time series further comprises, for each change, replacing data points associated with a given change with a function having a rising edge and a falling edge;
   g) calculating, by the one or more computer processors, a similarity metric between the simplified candidate time series and the simplified reference time series;
   h) reporting an occurrence of a computing event similar to the reference computing event in response to the similarity metric exceeding a threshold;
   receiving a plurality of candidate time series on the order of hundreds or more; and
   repeating steps e)-h) for each candidate time series in the plurality of candidate time series.

2. The method of claim 1 further comprises capturing performance data using an agent instructed in a monitored software application, and constructing the candidate time series from the captured performance data.

3. The method of claim 1 further comprises identifying one or more changes using a pruned exact linear time search method or a binary segmentation algorithm.

4. The method of claim 1 wherein constructing a simplified candidate time series further comprises, for each change, setting data points associated with a given change to a value of one.

5. The method of claim 1 wherein constructing a simplified candidate time series further comprises, for each change, determining a confidence value and setting data points associated with a given change to the confidence value.

6. The method of claim 1 wherein the similarity metric is defined as a Pearson correlation coefficient.

7. The method of claim 1 wherein the similarity metric is defined as an edit distance.

8. The method of claim 1 further comprises:
identifying a root cause for an abnormality in the distributed computing environment as a candidate time series having similarity metric with highest value amongst the plurality of candidate time series.

9. A computer-implemented method for identifying an occurrence of a computing event in a distributed computing environment, comprising:
a) providing a reference time series indicative of a reference computing event in the distributed computing environment;
b) identifying, by one or more computer processors, one or more changes in the reference time series;
c) constructing, by the one or more computer processors, a simplified reference time series from the reference time series, where the one or more changes are retained in the simplified reference time series, and remaining data points in the reference time series are set to zero in the simplified reference time series;
d) receiving a candidate time series comprised of data captured in the distributed computing environment;
e) identifying, by the one or more computer processors, one or more changes in the candidate time series;
f) constructing, by the one or more computer processors, a simplified candidate time series from the candidate time series, where the one or more changes are retained in the simplified candidate time series, and remaining data points in the candidate time series are set to zero in the simplified candidate time series, wherein constructing a simplified candidate time series further comprises, for each change, determining a confidence value and setting data points associated with a given change to the confidence value;
g) calculating, by the one or more computer processors, a similarity metric between the simplified candidate time series and the simplified reference time series; and
h) reporting an occurrence of a computing event similar to the reference computing event in response to the similarity metric exceeding a threshold;
receiving a plurality of candidate time series on the order of hundreds or more; and
repeating steps e)-h) for each candidate time series in the plurality of candidate time series.

10. The method of claim 9 further comprises capturing performance data using an agent instructed in a monitored software application, and constructing the candidate time series from the captured performance data.

11. The method of claim 9 further comprises identifying one or more changes using a pruned exact linear time search method or a binary segmentation algorithm.

12. The method of claim 9 wherein constructing a simplified candidate time series further comprises, for each change, setting data points associated with a given change to a value of one.

13. The method of claim 9 wherein constructing a simplified candidate time series further comprises, for each change, replacing data points associated with a given change with a function having a rising edge and a falling edge.

14. The method of claim 9 wherein the similarity metric is defined as a Pearson correlation coefficient.

15. The method of claim 9 wherein the similarity metric is defined as an edit distance.

16. The method of claim 9 further comprises
receiving a plurality of candidate time series;
repeating steps e)-g) for each candidate time series in the plurality of candidate time series; and
identifying a root cause for an abnormality in the distributed computing environment as a candidate time series having a similarity metric with a highest value amongst the plurality of candidate time series.

* * * * *